United States Patent
Xu et al.

(10) Patent No.: US 9,762,318 B2
(45) Date of Patent: Sep. 12, 2017

(54) TIME SYNCHRONIZATION APPARATUS AND METHOD FOR AUTOMATICALLY DETECTING THE ASYMMETRY OF AN OPTICAL FIBER

(71) Applicant: ZTE Corporation, Shenzhen, Guangdong (CN)

(72) Inventors: Jianxin Xu, Shenzhen (CN); Li He, Shenzhen (CN); Liang Xia, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 14/426,070

(22) PCT Filed: Jul. 10, 2013

(86) PCT No.: PCT/CN2013/079162
§ 371 (c)(1),
(2) Date: Mar. 4, 2015

(87) PCT Pub. No.: WO2013/167026
PCT Pub. Date: Nov. 14, 2013

(65) Prior Publication Data
US 2015/0229388 A1    Aug. 13, 2015

(30) Foreign Application Priority Data
Nov. 23, 2012 (CN) .......................... 2012 1 0484075

(51) Int. Cl.
*H04B 10/071* (2013.01)
*H04B 10/25* (2013.01)
*H04L 7/00* (2006.01)

(52) U.S. Cl.
CPC ........... *H04B 10/071* (2013.01); *H04B 10/25* (2013.01); *H04L 7/0075* (2013.01)

(58) Field of Classification Search
CPC .. H04B 10/07; H04B 10/071; H04B 10/0075; H04B 10/25
(Continued)

(56) References Cited

U.S. PATENT DOCUMENTS

| | | | |
|---|---|---|---|
| 2004/0047629 A1* | 3/2004 | Evangelides, Jr. | .. H04B 10/071 398/33 |
| 2007/0127919 A1 | 6/2007 | Kallstenius | |

(Continued)

FOREIGN PATENT DOCUMENTS

| | | |
|---|---|---|
| CN | 101765763 A | 6/2010 |
| CN | 102244572 A | 11/2011 |

(Continued)

OTHER PUBLICATIONS

Supplementary European Search Report in European application No. 13788124.9, dated Aug. 27, 2015.
(Continued)

*Primary Examiner* — Dalzid Singh
(74) *Attorney, Agent, or Firm* — Oppedahl Patent Law Firm LLC

(57) ABSTRACT

A time synchronization apparatus and method for automatically detecting the asymmetry of an optical fiber. The apparatus comprises an OTDR asymmetry detecting module (12), a time delay compensating module (14) and a time synchronization correcting module (16), the OTDR asymmetry detecting module (12) comprises an emitting unit (122) used for emitting a detection signal to the optical fiber, a receiving unit (124) used for receiving the detection signal returned by the optical fiber, a transmission time delay determining unit (126) used for determining the transmission time delay of the detection signal in the optical fiber according to the time difference between the emitting detection signal and the returned detection signal, and the deter- (Continued)

mining transmission time delay of a service signal in the optical fiber according to the transmission time delay of the detection signal; The time delay compensating module (14) is used for calculating asymmetric time delay value between the first optical fiber and the second optical fiber according to the transmission time delay of the first optical fiber and the transmission time delay of the second optical fiber; The time synchronization correcting module (16) is used for synchronization correcting time according to the asymmetry time delay. The apparatus and method can improve the time synchronism precision.

22 Claims, 10 Drawing Sheets

(58) Field of Classification Search
USPC .......................................................... 398/29
See application file for complete search history.

(56) References Cited

U.S. PATENT DOCUMENTS

| | | | |
|---|---|---|---|
| 2009/0002765 A1 | 1/2009 | Nordback | |
| 2009/0027656 A1 | 1/2009 | Zhang | |
| 2012/0170631 A1* | 7/2012 | Liu | ................ H04L 43/0864 375/224 |
| 2012/0237213 A1* | 9/2012 | Yin | .................. H04L 43/50 398/28 |
| 2013/0195443 A1* | 8/2013 | Yin | .................. H04J 3/0667 398/25 |
| 2013/0209096 A1 | 8/2013 | Le Pallec | |

FOREIGN PATENT DOCUMENTS

| | | |
|---|---|---|
| CN | 102412955 A | 4/2012 |
| CN | 102742190 A | 10/2012 |
| CN | 103119872 A | 5/2013 |
| JP | H10062570 A | 3/1998 |
| JP | 2010062570 A | 3/2010 |
| JP | 2010534855 A | 11/2010 |
| JP | 2013538022 A | 10/2013 |
| WO | 2005064827 A1 | 7/2005 |
| WO | 2008093600 A1 | 8/2008 |
| WO | 2009018235 A1 | 2/2009 |
| WO | 2012038644 A1 | 3/2012 |
| WO | 2012092892 A2 | 7/2012 |

OTHER PUBLICATIONS

International Search Report in international application No. PCT/CN2013/079162, dated Oct. 17, 2013.
English Translation of the Written Opinion of the International Search Authority in international application No. PCT/CN2013/079162, dated Oct. 17, 2013.

* cited by examiner

TIME SYNCHRONIZATION APPARATUS AND METHOD FOR AUTOMATICALLY DETECTING THE ASYMMETRY OF AN OPTICAL FIBER

TECHNICAL FIELD

The disclosure relates to clock synchronization in the field of communication, and in particular to a clock synchronization apparatus and method with automatic optical fiber asymmetry detection.

BACKGROUND

Due to a requirement for clock synchronization in wireless TimeDivisionDuplexing (TDD), 1588 clock synchronization based on a synchronous Ethernet gradually becomes mainstream clock synchronization technology in the communication industry.

In an existing network, factors such as an optical cable core error, an optical cable construction splicing error, an optical cable fault splicing error, a tail fiber error and the like may cause an asymmetric bidirectional length phenomenon in an optical fiber. This may lead to bidirectional asymmetry in a transmission delay. Existing network data shows that there is a substantial probability that optical fiber asymmetry will cause a time error of 100 ns or more. Thus, optical fiber asymmetry will be a major concern in constructing a clock synchronized network.

At present, in clock synchronized network deployment, methods used by an operator to handle asymmetry mainly includes: a 1588 test instrument, optical fiber switching, a single bidirectional fiber, automatic ring test, or the like. With a 1588 test instrument, point-by-point compensation is required in networking, which can barely be used in large-scale node networking. In switching using an optical switch, there is hardly any compatibility to an existing device, with possible damage to a service. With limited applicability, an automatic ring test allows performing error judgement only on an established time network. A single bidirectional fiber is problematic in terms of user customs and ease of use. For example, an existing single bidirectional fiber in general can only be used for transmission of about 20 km, but cannot be used for a transmission distance of 100 Km or more. All the methods are flawed when used in an existing network. Thus, automatic asymmetry compensation in 1588 clock synchronization has become a hard nut to crack in the industry. Lack of a solution thereof seriously impacts deployment of a wireless TDD clock synchronized network.

1588 clock synchronization in principle relies on bidirectional symmetry of a transmission delay of an intermediate path between two synchronous nodes. Thus, asymmetry will have a huge impact on 1588 clock synchronization. With bidirectional length asymmetry, no accurate clock synchronization can be implemented, leading to poor clock synchronization.

SUMMARY

Embodiments of the disclosure provide a clock synchronization apparatus and method with automatic optical fiber asymmetry detection, capable of improving accuracy in clock synchronization in spite of bidirectional length asymmetry.

According to an aspect of the disclosure, a clock synchronization apparatus with automatic optical fiber asymmetry detection may include an Optical Time Domain Reflectometer (OTDR) asymmetry detecting module, a delay compensating module, and a clock synchronization correcting module. The OTDR asymmetry detecting module may include: a transmitting unit configured for transmitting a detecting signal in an optical fiber; a receiving unit configured for receiving an echo of the detecting signal returned by the optical fiber; and a transmission delay determining unit configured for determining a detecting signal transmission delay for transmission of the detecting signal in the optical fiber according to a lag between transmitting the detecting signal and receiving the echo of the detecting signal, and determining a service signal transmission delay for transmission of a service signal in the optical fiber according to the detecting signal transmission delay. The delay compensating module may be configured for computing an asymmetric delay between a first optical fiber and a second optical fiber according to a first service signal transmission delay for transmission of the service signal in the first optical fiber and a second service signal transmission delay for transmission of the service signal in the second optical fiber. The clock synchronization correcting module may be configured for performing clock synchronization correction according to the asymmetric delay.

When the apparatus is located at a slave network element (NE), the transmitting unit may be configured for transmitting the detecting signal respectively in the first optical fiber and the second optical fiber; the receiving unit may be configured for receiving an echo of the detecting signal returned by the first optical fiber and receiving an echo of the detecting signal returned by the second optical fiber; and the transmission delay determining unit may be configured for: determining, according to a first lag between transmitting the detecting signal in the first optical fiber and receiving the echo of the detecting signal returned by the first optical fiber, a first detecting signal transmission delay for transmission of the detecting signal in the first optical fiber; determining, according to a second lag between transmitting the detecting signal in the second optical fiber and receiving the echo of the detecting signal returned by the second optical fiber, a second detecting signal transmission delay for transmission of the detecting signal in the second optical fiber; determining the first service signal transmission delay according to the first detecting signal transmission delay; and determining the second service signal transmission delay according to the second detecting signal transmission delay.

When the apparatus is located at a master network element (NE), the transmitting unit may be configured for transmitting the detecting signal respectively in the first optical fiber and the second optical fiber; the receiving unit may be configured for receiving an echo of the detecting signal returned by the first optical fiber and receiving an echo of the detecting signal returned by the second optical fiber; and the transmission delay determining unit may be configured for: determining, according to a first lag between transmitting the detecting signal in the first optical fiber and receiving the echo of the detecting signal returned by the first optical fiber, a first detecting signal transmission delay for transmission of the detecting signal in the first optical fiber; determining, according to a second lag between transmitting the detecting signal in the second optical fiber and receiving the echo of the detecting signal returned by the second optical fiber, a second detecting signal transmission delay for transmission of the detecting signal in the second optical fiber; determining the first service signal transmission delay according to the first detecting signal transmission delay; determining the second service signal transmission delay according to the second detecting signal transmission delay; and sending the first service signal transmission delay and the second service signal transmission delay to a clock synchronization apparatus at a slave end.

When the apparatus is located at a slave network element (NE), the transmitting unit may be configured for transmitting the detecting signal in the first optical fiber; the receiving unit may be configured for receiving an echo of the detecting signal returned by the first optical fiber; the transmission delay determining unit may be configured for: determining, according to a first lag between transmitting the detecting signal in the first optical fiber and receiving the echo of the detecting signal returned by the first optical fiber, a first detecting signal transmission delay for transmission of the detecting signal in the first optical fiber, and determining the first service signal transmission delay according to the first detecting signal transmission delay; and the delay compensating module may be configured for: receiving the second service signal transmission delay sent by a clock synchronization apparatus at a master end; and computing, according to the first service signal transmission delay determined by the transmission delay determining unit at the slave end and the received second service signal transmission delay, the asymmetric delay between the first optical fiber and the second optical fiber.

When the apparatus is located at a master network element (NE), the transmitting unit may be configured for transmitting the detecting signal in the second optical fiber; the receiving unit may be configured for receiving an echo of the detecting signal returned by the second optical fiber; the transmission delay determining unit may be configured for: determining, according to a second lag between transmitting the detecting signal in the second optical fiber and receiving the echo of the detecting signal returned by the second optical fiber, a second detecting signal transmission delay for transmission of the detecting signal in the second optical fiber; and determining the second service signal transmission delay according to the second detecting signal transmission delay; and the delay compensating module may be configured for sending the second service signal transmission delay to a delay compensating module of a clock synchronization apparatus at a slave end.

The apparatus may further include an optical module apparatus including: a multiplexing module at a transmitting fiber side of the clock synchronization apparatus end, configured for multiplexing the service signal and the detecting signal transmitted by the transmitting unit of the OTDR asymmetry detecting module, and sending the multiplexed signal through a transmitting port of the optical module apparatus; and a first demultiplexing module at the transmitting fiber side of the clock synchronization apparatus end, configured for demultiplexing a signal reflected and/or scattered by the transmitting fiber to isolate the detecting signal, and sending the isolated detecting signal to the receiving unit of the OTDR asymmetry detecting module.

The optical module apparatus may further include: a second demultiplexing module at a receiving fiber side of the clock synchronization apparatus end, configured for demultiplexing the multiplexed signal of the service signal and the detecting signal received by the receiving fiber of the clock synchronization apparatus end to isolate the service signal.

The apparatus may further include a reflecting module configured for reflecting, at an optical fiber connector of the clock synchronization apparatus end, a detecting signal transmitted by a transmitting module of an opposite clock synchronization apparatus using a fixed wavelength reflecting sheet.

The transmission delay determining unit may include: a detecting delay determining subunit configured for determining the detecting signal transmission delay $P1x=(t2x-t1x)/2$ for transmission of the detecting signal in the optical fiber x, with the $t2x$ being an echo time when the OTDR asymmetry detecting module receives the echo of the detecting signal returned by the optical fiber x, and the $t1x$ being a transmitting time when the OTDR asymmetry detecting module transmits the detecting signal in the optical fiber x; and a service delay determining subunit configured for determining the service signal transmission delay $P2x=(n2x/n1x) \times P1x$ for transmission of the service signal in the optical fiber x, with $n2x$ being an index of refraction of the optical fiber x for a frequency of the service signal, and $n1x$ being an index of refraction of the optical fiber x for a frequency of the detecting signal.

The delay compensating module may be configured for computing the asymmetric delay $M=P21-P22$ between the first optical fiber and the second optical fiber, with $P21$ being the first service signal transmission delay, and $P22$ being the second service signal transmission delay.

The delay compensating module may be configured for computing the asymmetric delay M at a preset cycle, averaging over any asymmetric delay M computed within a preset processing duration, and sending the average asymmetric delay to the clock synchronization correcting module.

When the apparatus is located at a slave network element (NE), the clock synchronization correcting module may include: a timestamp counter configured for recording clock synchronization message timestamps T1, T2, T3, and T4; a compensation computing unit configured for computing an asymmetric delay compensation Offset=$[(A-B)+M]/2$, with $A=T2-T1$, and $B=T4-T3$; and a clock synchronization correcting unit configured for performing clock synchronization correction according to the asymmetric delay compensation.

The detecting signal may be a detecting optical pulse. The service signal may be a service optical pulse. A frequency of the detecting optical pulse may differ from a frequency of the service optical pulse.

According to an aspect of the disclosure, a clock synchronization method with automatic optical fiber asymmetry detection may include: transmitting, by a slave end, a detecting signal respectively in a first optical fiber and a second optical fiber; receiving, by the slave end, an echo of the detecting signal returned by the first optical fiber and receiving an echo of the detecting signal returned by the second optical fiber; determining, by the slave end according to a first lag between transmitting the detecting signal in the first optical fiber and receiving the echo of the detecting signal returned by the first optical fiber, a first detecting signal transmission delay for transmission of the detecting signal in the first optical fiber; determining a first service signal transmission delay for transmission of a service signal in the first optical fiber according to the first detecting signal transmission delay; determining, according to a second lag between transmitting the detecting signal in the second optical fiber and receiving the echo of the detecting signal returned by the second optical fiber, a second detecting signal transmission delay for transmission of the detecting signal in the second optical fiber; and determining, according to the second detecting signal transmission delay, a second service signal transmission delay for transmission of the service signal in the second optical fiber; computing, by the slave end, an asymmetric delay between the first optical fiber and the second optical fiber according to the first service signal transmission delay and the second service signal transmission delay; and performing, by the slave end, clock synchronization correction according to the asymmetric delay.

When the first optical fiber is a transmitting fiber of the slave end and the second optical fiber is a receiving fiber of the slave end, the slave end may multiplex the service signal and the detecting signal, send the multiplexed signal of the service signal and the detecting signal in the first optical fiber, and isolate the reflected and/or scattered detecting signal by demultiplexing a signal reflected and/or scattered by the first optical fiber. The slave end may send the detecting signal in the second optical fiber, and isolate a reflected and/or scattered detecting signal and a service signal sent by a master end by demultiplexing a signal received from the second optical fiber. When the first optical fiber is a receiving fiber of the slave end and the second optical fiber is a transmitting fiber of the slave end, the slave end may multiplex the service signal and the detecting signal, send the multiplexed signal of the service signal and the detecting signal in the second optical fiber, and isolate the reflected and/or scattered detecting signal by demultiplexing a signal reflected and/or scattered by the second optical fiber. The slave end may send the detecting signal in the first optical fiber, and isolate a reflected and/or scattered detecting signal and a service signal sent by a master end by demultiplexing a signal received from the first optical fiber.

When the first optical fiber is a transmitting fiber of the slave end and the second optical fiber is a receiving fiber of the slave end, when a multiplexed signal of the service signal and the detecting signal sent by the slave end is received from the first optical fiber, the detecting signal may be reflected by the master end at an optical fiber connector connecting the first optical fiber using a fixed wavelength reflecting sheet. When a detecting signal sent by the slave end is received from the second optical fiber, the detecting signal may be reflected by the master end at an optical fiber connector connecting the second optical fiber using a fixed wavelength reflecting sheet. When the first optical fiber is a receiving fiber of the slave end and the second optical fiber is a transmitting fiber of the slave end, when a multiplexed signal of the service signal and the detecting signal sent by the slave end is received from the second optical fiber, the detecting signal may be reflected by the master end at an optical fiber connector connecting the second optical fiber using a fixed wavelength reflecting sheet. When a detecting signal sent by the slave end is received from the first optical fiber, the detecting signal may be reflected by the master end at an optical fiber connector connecting the first optical fiber using a fixed wavelength reflecting sheet.

Determining the first detecting signal transmission delay according to the first lag between transmitting the detecting signal in the first optical fiber and receiving the echo of the detecting signal returned by the first optical fiber, and determining the first service signal transmission delay according to the first detecting signal transmission delay may include: determining the first detecting signal transmission delay $P11=(t21-t11)/2$, with $t21$ being a first echo time when receiving the echo of the detecting signal returned by the first optical fiber, and $t11$ being a first transmitting time when transmitting the detecting signal in the first optical fiber; and determining the first service signal transmission delay $P21=(n21/n11)\times P11$, with $n21$ being an index of refraction of the first optical fiber for the service signal, and $n11$ being an index of refraction of the first optical fiber for the detecting signal. Determining the second detecting signal transmission delay according to the second lag between transmitting the detecting signal in the second optical fiber and receiving the echo of the detecting signal returned by the second optical fiber, and determining the second service signal transmission delay according to the second detecting signal transmission delay may include: determining the second detecting signal transmission delay $P12=(t22-t12)/2$, with $t22$ being a second echo time when receiving the echo of the detecting signal returned by the second optical fiber, and $t12$ being a second transmitting time when transmitting the detecting signal in the second optical fiber; and determining the second service signal transmission delay $P22=(n22/n12)\times P12$, with $n22$ being an index of refraction of the second optical fiber for the service signal, and $n12$ being an index of refraction of the second optical fiber for the detecting signal.

Computing the asymmetric delay between the first optical fiber and the second optical fiber according to the first service signal transmission delay and the second service signal transmission delay may include: computing the asymmetric delay $M=P21-P22$ between the first optical fiber and the second optical fiber.

Performing, by the slave end, clock synchronization correction according to the asymmetric delay may include: recording, by a timestamp counter, clock synchronization message timestamps $T1$, $T2$, $T3$, and $T4$; computing an asymmetric delay compensation Offset=$[(A-B)+M]/2$, with $A=T2-T1$, and $B=T4-T3$; and performing clock synchronization correction according to the asymmetric delay compensation.

According to an aspect of the disclosure, a clock synchronization method with automatic optical fiber asymmetry detection may include: transmitting, by a master end, a detecting signal respectively in a first optical fiber and a second optical fiber; receiving, by the master end, an echo of the detecting signal returned by the first optical fiber and receiving an echo of the detecting signal returned by the second optical fiber; determining, by the master end according to a first lag between transmitting the detecting signal in the first optical fiber and receiving the echo of the detecting signal returned by the first optical fiber, a first detecting signal transmission delay for transmission of the detecting signal in the first optical fiber; determining a first service signal transmission delay for transmission of a service signal in the first optical fiber according to the first detecting signal transmission delay; determining, according to a second lag between transmitting the detecting signal in the second optical fiber and receiving the echo of the detecting signal returned by the second optical fiber, a second detecting signal transmission delay for transmission of the detecting signal in the second optical fiber; and determining, according to the second detecting signal transmission delay, a second service signal transmission delay for transmission of the service signal in the second optical fiber; and sending, by the master end, the first service signal transmission delay and the second service signal transmission delay to a slave end, such that the slave end may compute an asymmetric delay between the first optical fiber and the second optical fiber according to the first service signal transmission delay and the second service signal transmission delay, and perform clock synchronization correction according to the asymmetric delay.

According to an aspect of the disclosure, a clock synchronization method with automatic optical fiber asymmetry detection may include: transmitting, by a slave end, a detecting signal in a first optical fiber, and receiving an echo of the detecting signal returned by the first optical fiber; determining, by the slave end according to a first lag between transmitting the detecting signal in the first optical fiber and receiving the echo of the detecting signal returned by the first optical fiber, a first detecting signal transmission delay for transmission of the detecting signal in the first optical fiber; and determining, according to the first detecting signal transmission delay, a first service signal transmission delay for transmission of a service signal in the first optical fiber; computing, by the slave end according to the first service signal transmission delay and a received second service signal transmission delay sent by a master end for transmission of the service signal in a second optical fiber, an asymmetric delay between the first optical fiber and the second optical fiber. The master end may acquire the second service signal transmission delay by: transmitting a detecting signal in the second optical fiber, receiving an echo of the detecting signal returned by the second optical fiber, determining, according to a second lag between transmitting the detecting signal in the second optical fiber and receiving the echo of the detecting signal returned by the second optical fiber, a second detecting signal transmission delay for transmission of the detecting signal in the second optical fiber, and determining, according to the second detecting signal transmission delay, the second service signal transmission delay. The slave end may perform clock synchronization correction according to the asymmetric delay.

The first optical fiber may be a transmitting fiber of the slave end and a receiving fiber of the master end and the second optical fiber may be a receiving fiber of the slave end and a transmitting fiber of the master end. Or the first optical fiber may be a transmitting fiber of the master end and a receiving fiber of the slave end and the second optical fiber may be a receiving fiber of the master end and a transmitting fiber of the slave end.

Determining the first detecting signal transmission delay according to the first lag between transmitting the detecting signal in the first optical fiber and receiving the echo of the detecting signal returned by the first optical fiber, and determining the first service signal transmission delay according to the first detecting signal transmission delay may include: determining the first detecting signal transmission delay $P11=(t21-t11)/2$, with $t21$ being a first echo time when receiving the echo of the detecting signal returned by the first optical fiber, and $t11$ being a first transmitting time when transmitting the detecting signal in the first optical fiber; and determining the first service signal transmission delay $P21=(n21/n11)\times P11$, with $n21$ being an index of refraction of the first optical fiber for the service signal, and $n11$ being an index of refraction of the first optical fiber for the detecting signal. Determining, according to a second lag between transmitting the detecting signal in the second optical fiber and receiving the echo of the detecting signal returned by the second optical fiber, a second detecting signal transmission delay for transmission of the detecting signal in the second optical fiber, and determining, according to the second detecting signal transmission delay, the second service signal transmission delay may include: determining the second detecting signal transmission delay $P12=(t22-t12)/2$, with $t22$ being a second echo time when receiving the echo of the detecting signal returned by the second optical fiber, and $t12$ being a second transmitting time when transmitting the detecting signal in the second optical fiber; and determining the second service signal transmission delay $P22=(n22/n12)\times P12$, with $n22$ being an index of refraction of the second optical fiber for the service signal, and $n12$ being an index of refraction of the second optical fiber for the detecting signal.

Computing the asymmetric delay between the first optical fiber and the second optical fiber according to the first service signal transmission delay and the second service signal transmission delay may include: computing the asymmetric delay $M=P21-P22$ between the first optical fiber and the second optical fiber.

Performing, by the slave end, clock synchronization correction according to the asymmetric delay may include: recording, by a timestamp counter, clock synchronization message timestamps T1, T2, T3, and T4; computing an asymmetric delay compensation $Offset=[(A-B)+M]/2$, with $A=T2-T1$, and $B=T4-T3$; and performing clock synchronization correction according to the asymmetric delay compensation.

When the first optical fiber is a transmitting fiber of the slave end and a receiving fiber of the master end and the second optical fiber is a receiving fiber of the slave end and a transmitting fiber of the master end, the slave end may multiplex the service signal and the detecting signal, send the multiplexed signal of the service signal and the detecting signal in the first optical fiber, and isolate the detecting signal by demultiplexing a signal reflected and/or scattered by the first optical fiber. The master end may multiplex the service signal and the detecting signal, send the multiplexed signal of the service signal and the detecting signal in the second optical fiber, and demultiplex a signal reflected and/or scattered by the second optical fiber to isolate the detecting signal.

The method may further include: when a multiplexed signal of the service signal and the detecting signal sent by the master end is received from the second optical fiber, the detecting signal may be reflected by the slave end at an optical fiber connector connecting the second optical fiber using a fixed wavelength reflecting sheet. When a multiplexed signal of the service signal and the detecting signal sent by the slave end is received from the first optical fiber, the detecting signal may be reflected by the master end at an optical fiber connector connecting the first optical fiber using a fixed wavelength reflecting sheet.

With an embodiment herein, a lag between a transmitted detecting signal and a received echo of the detecting signal returned by backscattering/reflection may be measured online to determine a detecting signal transmission delay for transmission of a detecting signal in an optical fiber. Then, a service signal transmission delay for transmission of a service signal in the optical fiber may be determined. In addition, optical fiber delays in both directions may be compared. An asymmetric delay in bidirectional optical fiber transmission may be acquired according to optical fiber delays in both directions. Asymmetric delay compensation may then be performed accordingly. Such clock synchronization correction reduces impact of bidirectional optical fiber asymmetry, improving accuracy in clock synchronization in spite of bidirectional length asymmetry.

DETAILED DESCRIPTION

An Optical Time Domain Reflectometer (OTDR) is a sophisticated photoelectric measurement system made using backscattering produced by Rayleigh scattering and Fresnel diffraction in transmission of an optical pulse in an optical fiber. An OTDR transmits an optical pulse in an optical fiber. Then, information scattered and reflected back is received at an OTDR port of the same optical fiber to perform optical fiber distance and delay analysis. Due to a nature of an optical fiber per se, while transmitting in an optical fiber, an optical pulse will be scattered and/or reflected because of a connector, a junction, a bend, or another similar event. Part of the scattered and/or reflected pulse will be returned back into the OTDR. A detector of the OTDR measures returned useful information, which may serve as time or curve fragments at different locations inside the optical fiber.

An embodiment herein provides a clock synchronization apparatus and method with automatic optical fiber asymmetry detection using OTDR technology. A lag between a transmitted pulse and received backscattering light is measured online to determine an optical fiber delay. In addition, optical fiber delays in both directions may be compared with each other. An asymmetric delay in bidirectional optical fiber transmission may be acquired according to optical fiber delays in both directions. Asymmetric delay compensation may then be performed accordingly. Such clock synchronization correction reduces impact of bidirectional optical fiber asymmetry, improving accuracy in clock synchronization in spite of bidirectional length asymmetry.

The present disclosure is further elaborated below with reference to the drawings and embodiments. Note that embodiments herein and features therein can be combined with each other as long as no conflict results from the combination.

Apparatus Embodiment

Figure 1:
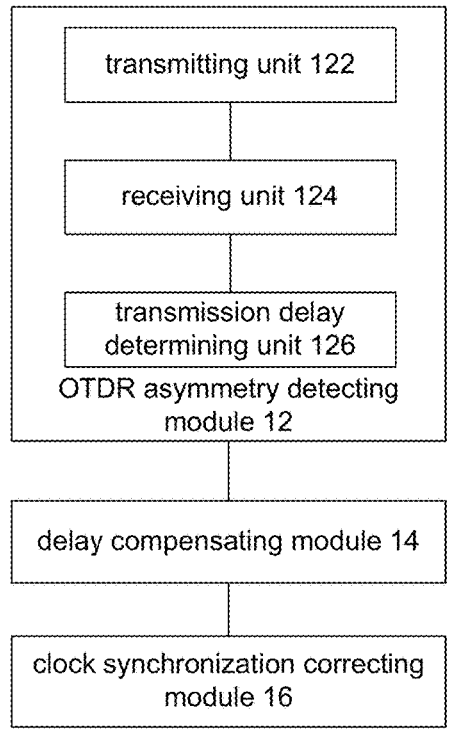
FIG. 1 is a block diagram of a structure of a clock synchronization apparatus with automatic optical fiber asymmetry detection according to an embodiment herein.

FIG. 1 is a block diagram of a structure of a clock synchronization apparatus with automatic optical fiber asymmetry detection according to an embodiment herein. As shown in FIG. 1, the clock synchronization apparatus with automatic optical fiber asymmetry detection includes an OTDR asymmetry detecting module 12, a delay compensating module 14, and a clock synchronization correcting module 16.

The OTDR asymmetry detecting module 12 includes: a transmitting unit 122 configured for transmitting a detecting signal in an optical fiber; a receiving unit 124 configured for receiving an echo of the detecting signal returned by the optical fiber; and a transmission delay determining unit 126 configured for determining a detecting signal transmission delay for transmission of the detecting signal in the optical fiber according to a lag between transmitting the detecting signal and receiving the echo of the detecting signal, and determining a service signal transmission delay for transmission of a service signal in the optical fiber according to the detecting signal transmission delay.

The delay compensating module 14 is configured for computing an asymmetric delay between a first optical fiber and a second optical fiber according to a first service signal transmission delay for transmission of the service signal in the first optical fiber and a second service signal transmission delay for transmission of the service signal in the second optical fiber.

The clock synchronization correcting module 16 is configured for performing clock synchronization correction according to the asymmetric delay.

With the apparatus, a lag between a transmitted detecting signal and a received echo of the detecting signal returned by backscattering/reflection may be measured online to determine a detecting signal transmission delay for transmission of the detecting signal in an optical fiber. Then, a service signal transmission delay for transmission of a service signal in the optical fiber may be determined. In addition, optical fiber delays in both directions (delays in both the first optical fiber and the second optical fiber) may be compared with each other. An asymmetric delay in bidirectional optical fiber transmission may be acquired according to optical fiber delays in both directions for performing clock synchronization correction, reducing impact of bidirectional optical fiber asymmetry, improving accuracy in clock synchronization in spite of bidirectional length asymmetry.

The detecting signal may be a detecting optical pulse. The service signal may be a service optical pulse. A frequency of the detecting optical pulse may differ from a frequency of the service optical pulse.

A detecting signal may be sent in a single direction. For example, an OTDR asymmetry detecting signal may be sent only at a transmitting fiber side or a receiving fiber side. An OTDR asymmetry detecting signal may be sent in both directions, such as at both a transmitting fiber side and a receiving fiber side, as described respectively below.

(1) Bidirectional Sending

A detecting signal may be sent in both directions. For example, an OTDR asymmetry detecting signal may be sent at both a transmitting fiber side and a receiving fiber side of a slave end. Alternatively, an OTDR asymmetry detecting signal may be sent at both a transmitting fiber side and a receiving fiber side of a master end.

An OTDR asymmetry detecting signal may be sent at both a transmitting fiber side and a receiving fiber side of a slave end using a clock synchronization apparatus as follows. In a clock synchronization apparatus with automatic optical fiber asymmetry detection at a slave end, a transmitting unit 122 may be configured for transmitting the detecting signal respectively in the first optical fiber and the second optical fiber. A receiving unit 124 may be configured for receiving an echo of the detecting signal returned by the first optical fiber and receiving an echo of the detecting signal returned by the second optical fiber. A transmission delay determining unit 126 may be configured for: determining, according to a first lag between transmitting the detecting signal in the first optical fiber and receiving the echo of the detecting signal returned by the first optical fiber, a first detecting signal transmission delay for transmission of the detecting signal in the first optical fiber; determining, according to a second lag between transmitting the detecting signal in the second optical fiber and receiving the echo of the detecting signal returned by the second optical fiber, a second detecting signal transmission delay for transmission of the detecting signal in the second optical fiber; determining the first service signal transmission delay according to the first detecting signal transmission delay; and determining the second service signal transmission delay according to the second detecting signal transmission delay. A delay compensating module 14 may be configured for computing an asymmetric delay between the first optical fiber and the second optical fiber according to the first transmission delay in the first optical fiber and the second transmission delay in the second optical fiber. A clock synchronization correcting module 16 may be configured for performing clock synchronization correction according to the asymmetric delay.

An OTDR asymmetry detecting signal may be sent at both a transmitting fiber side and a receiving fiber side of a master end using a clock synchronization apparatus as follows. In a clock synchronization apparatus with automatic optical fiber asymmetry detection at a master end, a transmitting unit 122 may be configured for transmitting the detecting signal respectively in the first optical fiber and the second optical fiber. A receiving unit 124 may be configured for receiving an echo of the detecting signal returned by the first optical fiber and receiving an echo of the detecting signal returned by the second optical fiber. A transmission delay determining unit 126 may be configured for: determining, according to a first lag between transmitting the detecting signal in the first optical fiber and receiving the echo of the detecting signal returned by the first optical fiber, a first detecting signal transmission delay for transmission of the detecting signal in the first optical fiber; determining, according to a second lag between transmitting the detecting signal in the second optical fiber and receiving the echo of the detecting signal returned by the second optical fiber, a second detecting signal transmission delay for transmission of the detecting signal in the second optical fiber; determining the first service signal transmission delay according to the first detecting signal transmission delay; determining the second service signal transmission delay according to the second detecting signal transmission delay; and sending the first service signal transmission delay and the second service signal transmission delay to a clock synchronization apparatus at a slave end. In the clock synchronization apparatus at the slave end, the delay compensating module 14 may be configured for computing an asymmetric delay between the first optical fiber and the second optical fiber according to the first transmission delay in the first optical fiber and the second transmission delay in the second optical fiber; the clock synchronization correcting module 16 may be configured for performing clock synchronization correction according to the asymmetric delay.

The first optical fiber may be a transmitting fiber of the slave end and a receiving fiber of the master end and the second optical fiber may be a receiving fiber of the slave end and a transmitting fiber of the master end. Alternatively, the first optical fiber may be a transmitting fiber of the master end and a receiving fiber of the slave end and the second optical fiber may be a receiving fiber of the master end and a transmitting fiber of the slave end.

With an aforementioned solution, both the first transmission delay in the first optical fiber and the second transmission delay in the second optical fiber may be acquired using just a clock synchronization apparatus with automatic optical fiber asymmetry detection at a slave end or a master end to determine an inter-fiber asymmetric delay for performing clock synchronization correction.

Part of a transmitted OTDR asymmetry detecting signal may return, by scattering and reflection, to a local OTDR asymmetry detecting module for subsequent processing. To allow more of the detecting signal to be returned to the OTDR asymmetry detecting module, a fixed wavelength reflecting sheet for the wavelength of an OTDR optical pulse may be added at an optical fiber connector of a network element (NE) to reflect an arriving detecting signal to increase the amount of echoed detecting signal, such that an OTDR asymmetry detecting module at a slave end or a master end may determine a transmission delay more accurately.

When an OTDR asymmetry detecting signal is sent at both a transmitting fiber side and a receiving fiber side of a slave end, the slave end may demultiplex a reflected signal received from the transmitting fiber, by Wavelength Division Multiplexing (WDM) for example to extract the reflected OTDR detecting signal, which may then be delivered to the receiving unit 124 of the OTDR asymmetry detecting module. The slave end may demultiplex a signal received from the receiving fiber (by WDM, for example) to extract the reflected detecting signal which may then be delivered to the receiving unit 124 of the OTDR asymmetry detecting module and extract the service signal, such that a service related module may perform normal service related processing.

When an OTDR asymmetry detecting signal is sent at both a transmitting fiber side and a receiving fiber side of a master end, the master end may demultiplex a reflected signal received from the transmitting fiber (by WDM, for example) to extract a reflected OTDR detecting optical pulse, which may then be delivered to the receiving unit 124 of the OTDR asymmetry detecting module. The master end may demultiplex a signal received from the receiving fiber (by WDM, for example) to extract the reflected detecting signal which may then be delivered to the receiving unit 124 of the OTDR asymmetry detecting module and extract the service signal, such that a service related module may perform normal service related processing.

(2) Unidirectional Sending

A detecting signal may be sent in a single direction. For example, an OTDR asymmetry detecting signal may be sent only at a transmitting fiber side of a slave NE and a master NE, or at a receiving fiber side of a slave NE and a receiving fiber side of a master NE.

In a clock synchronization apparatus with automatic optical fiber asymmetry detection at a slave end, a transmitting unit 122 may be configured for transmitting the detecting signal in the first optical fiber. A receiving unit 124 may be configured for receiving an echo of the detecting signal returned by the first optical fiber. A transmission delay determining unit 126 may be configured for: determining, according to a first lag between transmitting the detecting signal in the first optical fiber and receiving the echo of the detecting signal returned by the first optical fiber, a first detecting signal transmission delay for transmission of the detecting signal in the first optical fiber, and determining the first service signal transmission delay according to the first detecting signal transmission delay. A delay compensating module 14 may be configured for: receiving the second service signal transmission delay sent by a master end; and computing, according to the first service signal transmission delay determined by the transmission delay determining unit at the slave end and the received second service signal transmission delay, the asymmetric delay between the first optical fiber and the second optical fiber. A clock synchronization correcting module 16 may be configured for performing clock synchronization correction according to a bidirectional optical fiber asymmetric delay.

In a clock synchronization apparatus with automatic optical fiber asymmetry detection at a master end, a transmitting unit 122 may be configured for transmitting the detecting signal in the second optical fiber. A receiving unit 124 may be configured for receiving an echo of the detecting signal returned by the second optical fiber. A transmission delay determining unit 126 may be configured for: determining, according to a second lag between transmitting the detecting signal in the second optical fiber and receiving the echo of the detecting signal returned by the second optical fiber, a second detecting signal transmission delay for transmission of the detecting signal in the second optical fiber; and determining the second service signal transmission delay according to the second detecting signal transmission delay. A delay compensating module 14 may be configured for sending the second service signal transmission delay to a delay compensating module of a clock synchronization apparatus at a slave end.

The first optical fiber may be a transmitting fiber of the slave end and a receiving fiber of the master end and the second optical fiber may be a receiving fiber of the slave end and a transmitting fiber of the master end. Alternatively, the first optical fiber may be a transmitting fiber of the master end and a receiving fiber of the slave end and the second optical fiber may be a receiving fiber of the master end and a transmitting fiber of the slave end.

With an aforementioned solution, by cooperating with a clock synchronization apparatus at a master end, a slave end may acquire both the first service signal transmission delay and the second service signal transmission delay to determine an inter-fiber asymmetric delay for performing clock synchronization correction.

Part of a transmitted OTDR asymmetry detecting signal may return, by scattering and reflection, to a local (slave end) OTDR asymmetry detecting module for subsequent processing. To allow more of the detecting signal to be returned to the OTDR asymmetry detecting module, a fixed wavelength reflecting sheet for the wavelength of an OTDR optical pulse may be added at a receiving fiber connector of the master end to reflect a detecting signal arriving at the master end from the slave end; a fixed wavelength reflecting sheet for the wavelength of an OTDR signal may be added at a receiving fiber connector of a slave end to reflect a detecting signal arriving at the slave end from the master end to increase the amount of echoed detecting signal, such that OTDR asymmetry detecting modules at both ends may determine a transmission delay more accurately.

During clock synchronization, to avoid impacting normal service signal sending, a detecting signal and a service signal may be multiplexed and sent as a multiplexed signal using an apparatus as follows. A detecting signal as required by asymmetry detection may further be extracted from a multiplexed signal.

Figure 2:
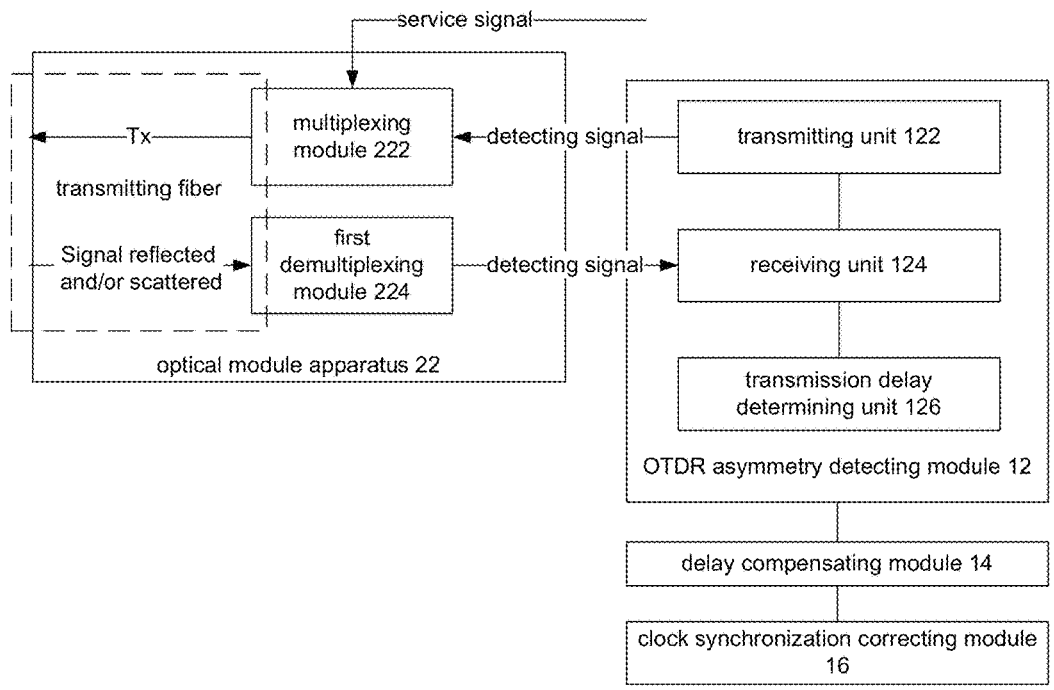
FIG. 2 is a block diagram of a first structure of a clock synchronization apparatus with automatic optical fiber asymmetry detection according to an embodiment herein.

FIG. 2 is a block diagram of a first structure of a clock synchronization apparatus with automatic optical fiber asymmetry detection according to an embodiment herein. As shown in FIG. 2, the apparatus may further include an optical module apparatus 22. The optical module apparatus 22 may include a multiplexing module 222, which may be located at a transmitting fiber side of the clock synchronization apparatus end. The multiplexing module may be configured for multiplexing the service signal and the detecting signal transmitted by the transmitting unit 122 of the OTDR asymmetry detecting module 12, and sending the multiplexed signal through a transmitting port of the optical module apparatus 22. The optical module apparatus may include a first demultiplexing module 224, which may be located at the transmitting fiber side of the clock synchronization apparatus end. The first demultiplexing module may be configured for demultiplexing a signal reflected and/or scattered by the transmitting fiber to isolate the detecting signal, and sending the isolated detecting signal to the receiving unit 124 of the OTDR asymmetry detecting module 12. The apparatus may provide a solution for sending a service signal and a detecting signal at a transmitting fiber, applicable to a unidirectional sending solution at a transmitting fiber at both a master and a slave, and a bidirectional sending solution at a master or a slave.

With the structure, clock synchronization correction may be performed online. A service message may be sent while performing asymmetry detection.

Figure 3:
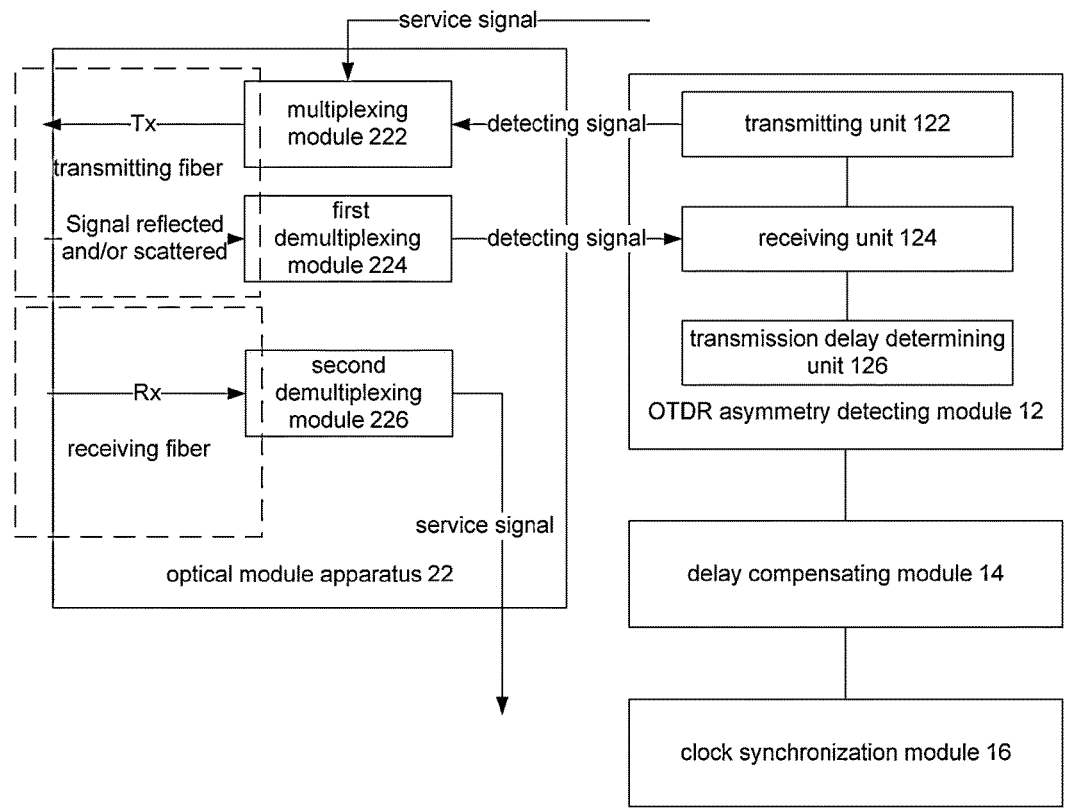
FIG. 3 is a block diagram of a second structure of a clock synchronization apparatus with automatic optical fiber asymmetry detection according to an embodiment herein.

When a detecting signal is added, in order to extract a service signal at a receiving fiber correctly, or extract a service signal and a detecting signal at a receiving fiber correctly, a demultiplexing module may be configured at the receiving fiber. FIG. 3 is a block diagram of a second structure of a clock synchronization apparatus with automatic optical fiber asymmetry detection according to an embodiment herein. As shown in FIG. 3, the optical module apparatus 22 may further include a second demultiplexing module 226. The second demultiplexing module may be located at a receiving fiber side of the clock synchronization apparatus end. The second demultiplexing module may be configured for demultiplexing the multiplexed signal of the service signal and the detecting signal received by the receiving fiber of the clock synchronization apparatus end to isolate the service signal (resolved by the second demultiplexing module 226 as in FIG. 3, applicable to a unidirectional sending solution at a transmitting fiber at both a master and a slave). Alternatively, the second demultiplexing module may be configured for isolating both the service signal and the detecting signal. The detecting signal may then be sent to the receiving unit 124 of the OTDR asymmetry detecting module 12 (not shown, applicable to a unidirectional sending solution by both a master and a slave at a receiving fiber, and bidirectional sending at a master or a slave).

Note that the multiplexing module 222, the first demultiplexing module 224 and the second demultiplexing module 226 may all be implemented by WDM. Given that both the multiplexing module 222 and the first demultiplexing module 224 may be located at a transmitting fiber side, one WDM may be used for implementing function of both.

As mentioned, to increase the amount of echoed detecting signal, such that OTDR asymmetry detecting modules at both ends may determine a transmission delay more accurately, the apparatus may further include a reflecting module configured for reflecting, at an optical fiber connector of the clock synchronization apparatus end, a detecting signal transmitted by a transmitting module of an opposite clock synchronization apparatus using a fixed wavelength reflecting sheet. The location of the reflecting module may be determined according to a detecting signal sending solution adopted. When a detecting signal is sent in both directions at a clock synchronization apparatus of a slave end, a reflecting module of a clock synchronization apparatus at a master end may reflect a detecting signal at connectors connecting a transmitting fiber and a receiving fiber, and vice versa. When a master end and a slave end perform unidirectional sending at a transmitting fiber, a reflecting module of a clock synchronization apparatus at an end may reflect a detecting signal at a receiving fiber connector. When a master end and a slave end perform unidirectional sending at a receiving fiber, a reflecting module of a clock synchronization apparatus at an end may reflect a detecting signal at a transmitting fiber connector.

With the reflecting module, a fixed wavelength reflecting sheet for the wavelength of an OTDR signal may be added at a receiving fiber connector of a master or slave end to reflect a detecting signal arriving at a master or slave end to increase the amount of echoed detecting signal, such that an OTDR asymmetry detecting module at a slave end or a master end may determine a transmission delay more accurately.

Figure 4:
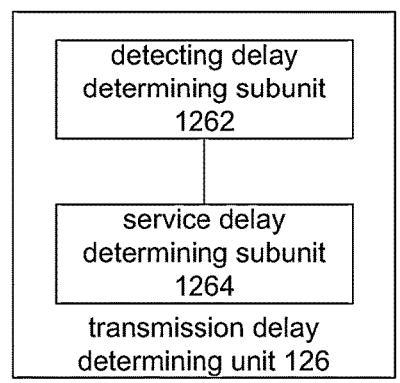
FIG. 4 is a block diagram of a detailed structure of a transmission delay determining unit according to an embodiment herein.

FIG. 4 is a block diagram of a detailed structure of a transmission delay determining unit according to an embodiment herein. As shown in FIG. 4, the transmission delay determining unit 126 may include: a detecting delay determining subunit 1262 configured for determining the detecting signal transmission delay $P1x=(t2x-t1x)/2$ for transmission of the detecting signal in the optical fiber x, with the $t2x$ being an echo time when the OTDR asymmetry detecting module 12 receives the echo of the detecting signal returned by the optical fiber x, and the $t1x$ being a transmitting time when the OTDR asymmetry detecting module 12 transmits the detecting signal in the optical fiber x; and a service delay determining subunit 1264 configured for determining the service signal transmission delay $P2x=(n2x/n1x) \times P1x$ for transmission of the service signal in the optical fiber x, with $n2x$ being an index of refraction of the optical fiber x for a frequency of the service signal, and $n1x$ being an index of refraction of the optical fiber x for a frequency of the detecting signal.

The delay compensating module 14 may be configured for computing the asymmetric delay $M=P21-P22$ between the first optical fiber and the second optical fiber. The P21 may be the first service signal transmission delay. The P22 may be the second service signal transmission delay.

To obtain a more accurate asymmetric delay, the delay compensating module 14 may be configured for computing the asymmetric delay M at a preset cycle, averaging over any asymmetric delay M computed within a preset processing duration, and sending the average asymmetric delay to the clock synchronization correcting module 16.

Figure 5:
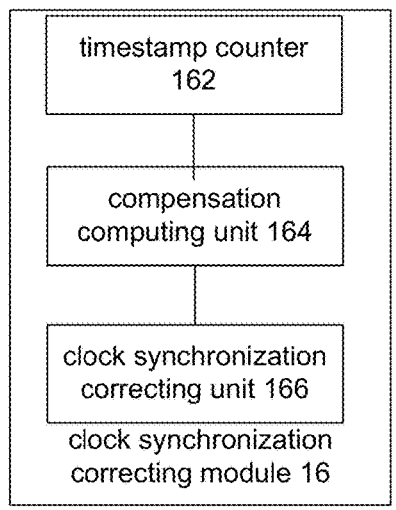
FIG. 5 is a block diagram of a detailed structure of a clock synchronization correcting module according to an embodiment herein.

FIG. 5 is a block diagram of a detailed structure of a clock synchronization correcting module according to an embodiment herein. As shown in FIG. 5, the clock synchronization correcting module 16 may include: a timestamp counter 162 configured for recording clock synchronization message timestamps T1, T2, T3, and T4; a compensation computing unit 164 configured for computing an asymmetric delay compensation $Offset=[(A-B)+M]/2$, with $A=T2-T1$, and $B=T4-T3$; and a clock synchronization correcting unit 166 configured for performing clock synchronization correction according to the asymmetric delay compensation.

With the apparatus, combining 1588 timestamps T1, T2, T3, and T4, synchronization correction may be implemented such that a slave NE may track the time at a master NE.

Method Embodiment

In a method embodiment, by sending a detecting signal and receiving a backwards-returned echo of the detecting signal, a transmission delay in an optical fiber may be learned. By comparing transmission delays in both optical fiber directions, a bidirectional asymmetric delay may be learned for performing clock synchronization correction. A detecting signal may be sent in a single direction. For example, an OTDR asymmetry detecting signal may be sent only at a transmitting fiber side of a slave NE and a master NE, or at a receiving fiber side of a slave NE and a receiving fiber side of a master NE. A detecting signal may be sent in both directions. For example, an OTDR asymmetry detecting signal may be sent at both a transmitting fiber side and a receiving fiber side of a slave NE, as described respectively below.

(1) Bidirectional Sending

Figure 6:
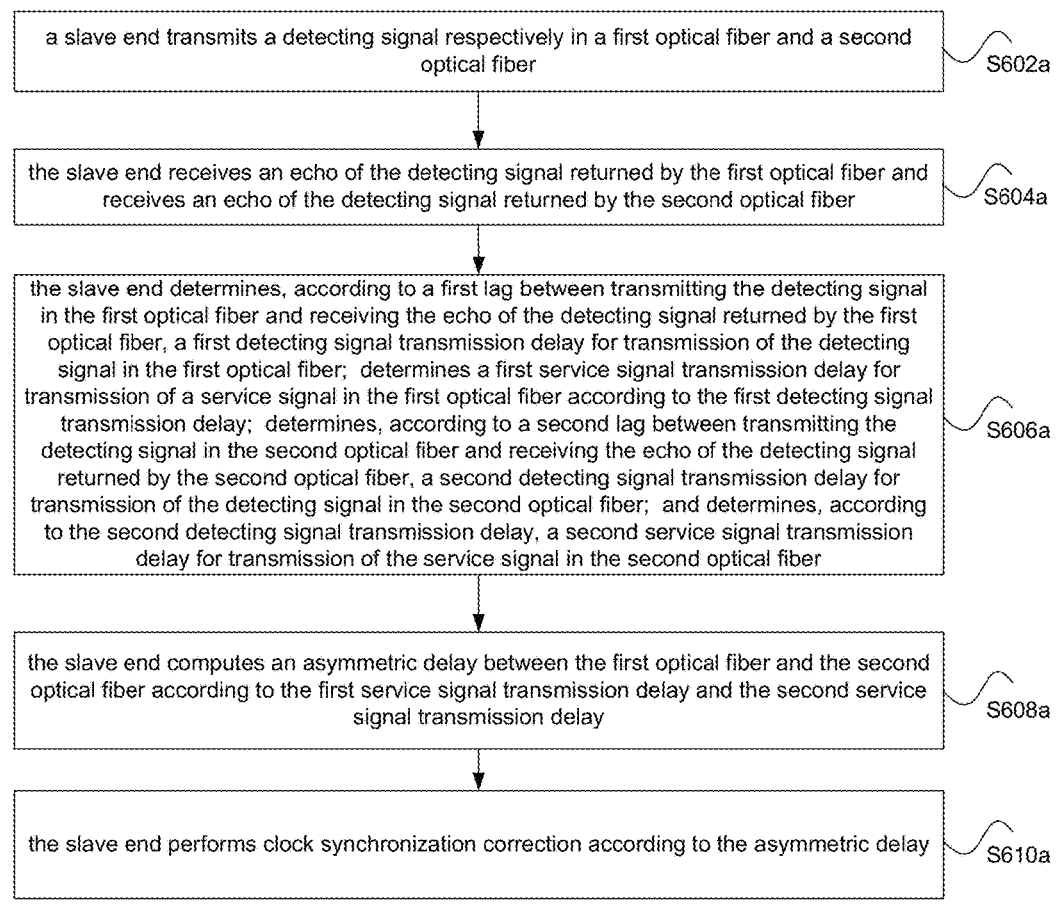
FIG. 6 is a first flowchart of a clock synchronization method with automatic optical fiber asymmetry detection based on bidirectional sending according to an embodiment herein.

FIG. 6 is a first flowchart of a clock synchronization method with automatic bidirectional optical fiber asymmetry detection based on bidirectional sending according to an embodiment herein. The method may include steps as follows.

In step S602a, a slave end transmits a detecting signal respectively in a first optical fiber and a second optical fiber.

In step S604a, the slave end receives an echo of the detecting signal returned by the first optical fiber and receives an echo of the detecting signal returned by the second optical fiber.

In step S606a, the slave end determines, according to a first lag between transmitting the detecting signal in the first optical fiber and receiving the echo of the detecting signal returned by the first optical fiber, a first detecting signal transmission delay for transmission of the detecting signal in the first optical fiber; determines a first service signal transmission delay for transmission of a service signal in the first optical fiber according to the first detecting signal transmission delay; determines, according to a second lag between transmitting the detecting signal in the second optical fiber and receiving the echo of the detecting signal returned by the second optical fiber, a second detecting signal transmission delay for transmission of the detecting signal in the second optical fiber; and determines, according to the second detecting signal transmission delay, a second service signal transmission delay for transmission of the service signal in the second optical fiber.

In step S608a, the slave end computes an asymmetric delay between the first optical fiber and the second optical fiber according to the first service signal transmission delay and the second service signal transmission delay.

In step S610a, the slave end performs clock synchronization correction according to the asymmetric delay.

The first optical fiber may be a transmitting fiber of the slave end and a receiving fiber of the master end and the second optical fiber may be a receiving fiber of the slave end and a transmitting fiber of the master end. Alternatively, the first optical fiber may be a transmitting fiber of the master end and a receiving fiber of the slave end and the second optical fiber may be a receiving fiber of the master end and a transmitting fiber of the slave end.

With the method, by sending a detecting signal in both the first optical fiber and the second optical fiber and receiving echoes of the detecting signal returned by both the first optical fiber and the second optical fiber, a slave end may acquire both the first service signal transmission delay and the second service signal transmission delay to determine an inter-fiber asymmetric delay for performing clock synchronization correction, reducing impact of bidirectional optical fiber asymmetry, improving accuracy in clock synchronization in spite of bidirectional length asymmetry.

When the first optical fiber is a transmitting fiber of the slave end and the second optical fiber is a receiving fiber of the slave end, the slave end may multiplex the service signal and the detecting signal, send the multiplexed signal of the service signal and the detecting signal in the first optical fiber, and isolate the reflected and/or scattered detecting signal by demultiplexing a signal reflected and/or scattered by the first optical fiber. The slave end may send the detecting signal in the second optical fiber, and isolate a reflected and/or scattered detecting signal and a service signal sent by a master end by demultiplexing a signal received from the second optical fiber.

When the first optical fiber is a receiving fiber of the slave end and the second optical fiber is a transmitting fiber of the slave end, the slave end may multiplex the service signal and the detecting signal, send the multiplexed signal of the service signal and the detecting signal in the second optical fiber, and isolate the reflected and/or scattered detecting signal by demultiplexing a signal reflected and/or scattered by the second optical fiber. The slave end may send the detecting signal in the first optical fiber, and isolate a reflected and/or scattered detecting signal and a service signal sent by a master end by demultiplexing a signal received from the first optical fiber.

With the method, a slave end may send a service message while performing asymmetry detection, implementing online clock synchronization.

Part of a transmitted OTDR asymmetry detecting signal may return, by scattering and reflection, to a local (slave end) OTDR asymmetry detecting module for subsequent processing. To allow more of the detecting signal to be returned to the OTDR asymmetry detecting module, the master end may reflect, at an optical fiber connector connecting the first optical fiber and/or an optical fiber connector connecting the second optical fiber, the detecting signal using a fixed wavelength reflecting sheet. With the method, the amount of echoed detecting signal may be increased, such that an OTDR asymmetry detecting module at a slave end may determine a transmission delay more accurately.

In determining the first detecting signal transmission delay according to the first lag between transmitting the detecting signal in the first optical fiber and receiving the echo of the detecting signal returned by the first optical fiber, and determining the first service signal transmission delay according to the first detecting signal transmission delay, the method may include step as follows. The first detecting signal transmission delay $P11=(t21-t11)/2$ may be determined. The $t21$ may be a first echo time when receiving the echo of the detecting signal returned by the first optical fiber. The $t11$ may be a first transmitting time when transmitting the detecting signal in the first optical fiber. The first service signal transmission delay $P21=(n21/n11) \times P11$ may be determined. The $n21$ may be an index of refraction of the first optical fiber for the service signal. The $n11$ may be an index of refraction of the first optical fiber for the detecting signal. In determining the second detecting signal transmission delay according to the second lag between transmitting the detecting signal in the second optical fiber and receiving the echo of the detecting signal returned by the second optical fiber, and determining the second service signal transmission delay according to the second detecting signal transmission delay, the method may include step as follows. The second detecting signal transmission delay $P12=(t22-t12)/2$ may be determined. The $t22$ may be a second echo time when receiving the echo of the detecting signal returned by the second optical fiber. The $t12$ may be a second transmitting time when transmitting the detecting signal in the second optical fiber. The second service signal transmission delay $P22=(n22/n12) \times P12$ may be determined. The $n22$ may be an index of refraction of the second optical fiber for the service signal. The $n12$ may be an index of refraction of the second optical fiber for the detecting signal.

In step S608a, the asymmetric delay $M=P21-P22$ between the first optical fiber and the second optical fiber may be computed.

In step S610a, a timestamp counter may record clock synchronization message timestamps T1, T2, T3, and T4; an asymmetric delay compensation $Offset=[(A-B)+M]/2$ may be computed, with $A=T2-T1$, and $B=T4-T3$; and clock synchronization correction may be performed according to the asymmetric delay compensation.

With the method, combining 1588 timestamps T1, T2, T3, and T4, a system time may be corrected.

Figure 7:
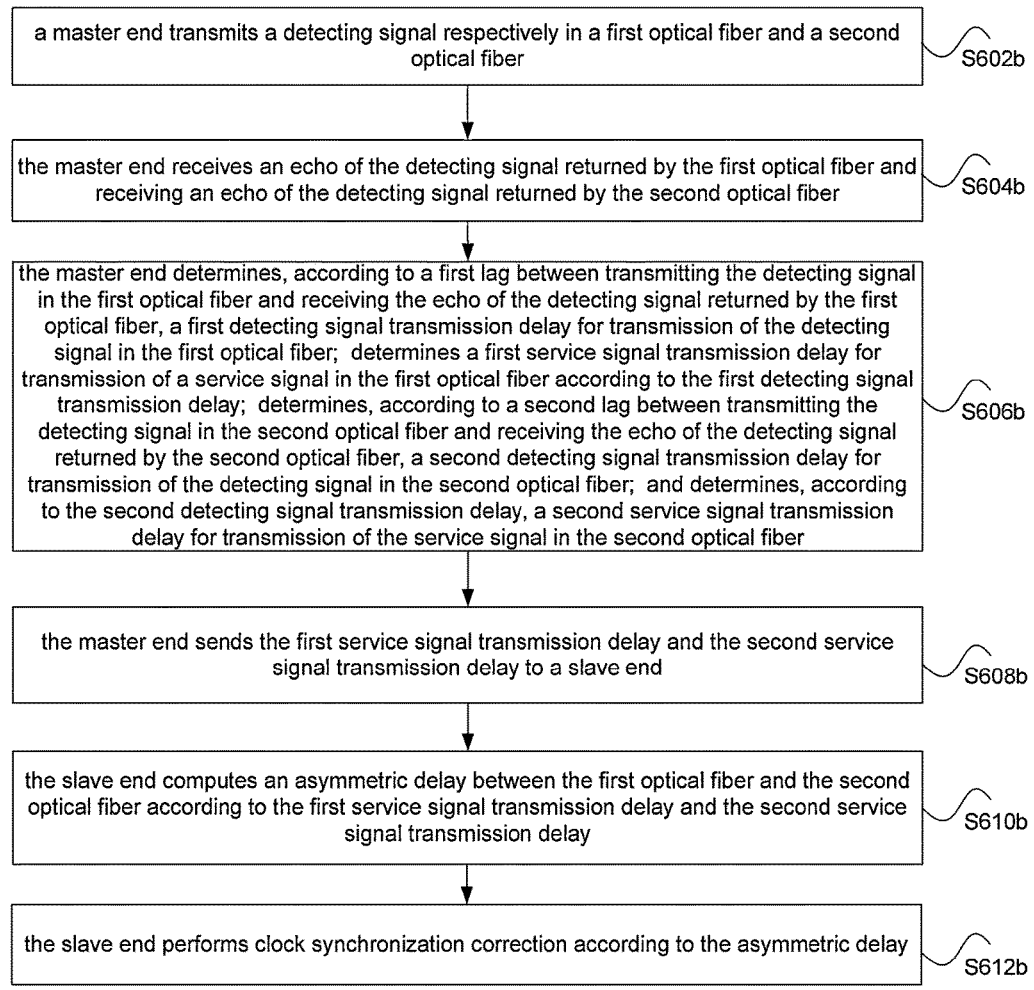
FIG. 7 is a second flowchart of a clock synchronization method with automatic optical fiber asymmetry detection based on bidirectional sending according to an embodiment herein.

FIG. 7 is a second flowchart of a clock synchronization method with automatic bidirectional optical fiber asymmetry detection based on bidirectional sending according to an embodiment herein. The method may include steps as follows.

In step S602b, a master end transmits a detecting signal respectively in a first optical fiber and a second optical fiber.

In step S604b, the master end receives an echo of the detecting signal returned by the first optical fiber and receiving an echo of the detecting signal returned by the second optical fiber.

In step S606b, the master end determines, according to a first lag between transmitting the detecting signal in the first optical fiber and receiving the echo of the detecting signal returned by the first optical fiber, a first detecting signal transmission delay for transmission of the detecting signal in the first optical fiber; determines a first service signal transmission delay for transmission of a service signal in the first optical fiber according to the first detecting signal transmission delay; determines, according to a second lag between transmitting the detecting signal in the second optical fiber and receiving the echo of the detecting signal returned by the second optical fiber, a second detecting signal transmission delay for transmission of the detecting signal in the second optical fiber; and determines, according to the second detecting signal transmission delay, a second service signal transmission delay for transmission of the service signal in the second optical fiber.

In step S608b, the master end sends the first service signal transmission delay and the second service signal transmission delay to a slave end.

In step S610b, the slave end computes an asymmetric delay between the first optical fiber and the second optical fiber according to the first service signal transmission delay and the second service signal transmission delay.

In step S612b, the slave end performs clock synchronization correction according to the asymmetric delay.

With the method, a master end may send a detecting signal in both the first optical fiber and the second optical fiber, receive echoes of the detecting signal returned by both the first optical fiber and the second optical fiber, and send the computed first service signal transmission delay and the computed second service signal transmission delay to a slave end. The slave end may acquire both the first service signal transmission delay and the second service signal transmission delay to determine an inter-fiber asymmetric delay for performing clock synchronization correction, reducing impact of bidirectional optical fiber asymmetry, improving accuracy in clock synchronization in spite of bidirectional length asymmetry.

When the first optical fiber is a transmitting fiber of the master end and the second optical fiber is a receiving fiber of the master end, the master end may multiplex the service signal and the detecting signal, send the multiplexed signal of the service signal and the detecting signal in the first optical fiber, and isolate the reflected and/or scattered detecting signal by demultiplexing a signal reflected and/or scattered by the first optical fiber. The master end may send the detecting signal in the second optical fiber, and isolate a reflected and/or scattered detecting signal and a service signal sent by a slave end by demultiplexing a signal received from the second optical fiber.

When the first optical fiber is a receiving fiber of the master end and the second optical fiber is a transmitting fiber of the master end, the master end may multiplex the service signal and the detecting signal, send the multiplexed signal of the service signal and the detecting signal in the second optical fiber, and isolate the reflected and/or scattered detecting signal by demultiplexing a signal reflected and/or scattered by the second optical fiber. The master end may send the detecting signal in the first optical fiber, and isolate a reflected and/or scattered detecting signal and a service signal sent by a slave end by demultiplexing a signal received from the first optical fiber.

With the method, a master end may send a service message while performing asymmetry detection, implementing online clock synchronization.

Part of a transmitted OTDR asymmetry detecting signal may return, by scattering and reflection, to a local (master end) OTDR asymmetry detecting module for subsequent processing. To allow more of the detecting signal to be returned to the OTDR asymmetry detecting module, the slave end may reflect, at an optical fiber connector connecting the first optical fiber and/or an optical fiber connector connecting the second optical fiber, the detecting signal using a fixed wavelength reflecting sheet. With the method, the amount of echoed detecting signal may be increased, such that an OTDR asymmetry detecting module at a master end may determine a transmission delay more accurately.

In determining the first detecting signal transmission delay according to the first lag between transmitting the detecting signal in the first optical fiber and receiving the echo of the detecting signal returned by the first optical fiber, and determining the first service signal transmission delay according to the first detecting signal transmission delay, the method may include step as follows. The first detecting signal transmission delay $P11=(t21-t11)/2$ may be determined. The $t21$ may be a first echo time when receiving the echo of the detecting signal returned by the first optical fiber. The $t11$ may be a first transmitting time when transmitting the detecting signal in the first optical fiber. The first service signal transmission delay $P21=(n21/n11)\times P11$ may be determined. The $n21$ may be an index of refraction of the first optical fiber for the service signal. The $n11$ may be an index of refraction of the first optical fiber for the detecting signal. In determining the second detecting signal transmission delay according to the second lag between transmitting the detecting signal in the second optical fiber and receiving the echo of the detecting signal returned by the second optical fiber, and determining the second service signal transmission delay according to the second detecting signal transmission delay, the method may include step as follows. The second detecting signal transmission delay $P12=(t22-t12)/2$ may be determined. The $t22$ may be a second echo time when receiving the echo of the detecting signal returned by the second optical fiber. The $t12$ may be a second transmitting time when transmitting the detecting signal in the second optical fiber. The second service signal transmission delay $P22=(n22/n12)\times P12$ may be determined. The $n22$ may be an index of refraction of the second optical fiber for the service signal. The $n12$ may be an index of refraction of the second optical fiber for the detecting signal.

In step S610b, the asymmetric delay $M=P21-P22$ between the first optical fiber and the second optical fiber may be computed.

In step S612b, a timestamp counter may record clock synchronization message timestamps T1, T2, T3, and T4; an asymmetric delay compensation Offset=$[(A-B)+M]/2$ may be computed, with $A=T2-T1$, and $B=T4-T3$; and clock synchronization correction may be performed according to the asymmetric delay compensation.

With the method, combining 1588 timestamps T1, T2, T3, and T4, a system time may be corrected.

(2) Unidirectional Sending

Figure 8:
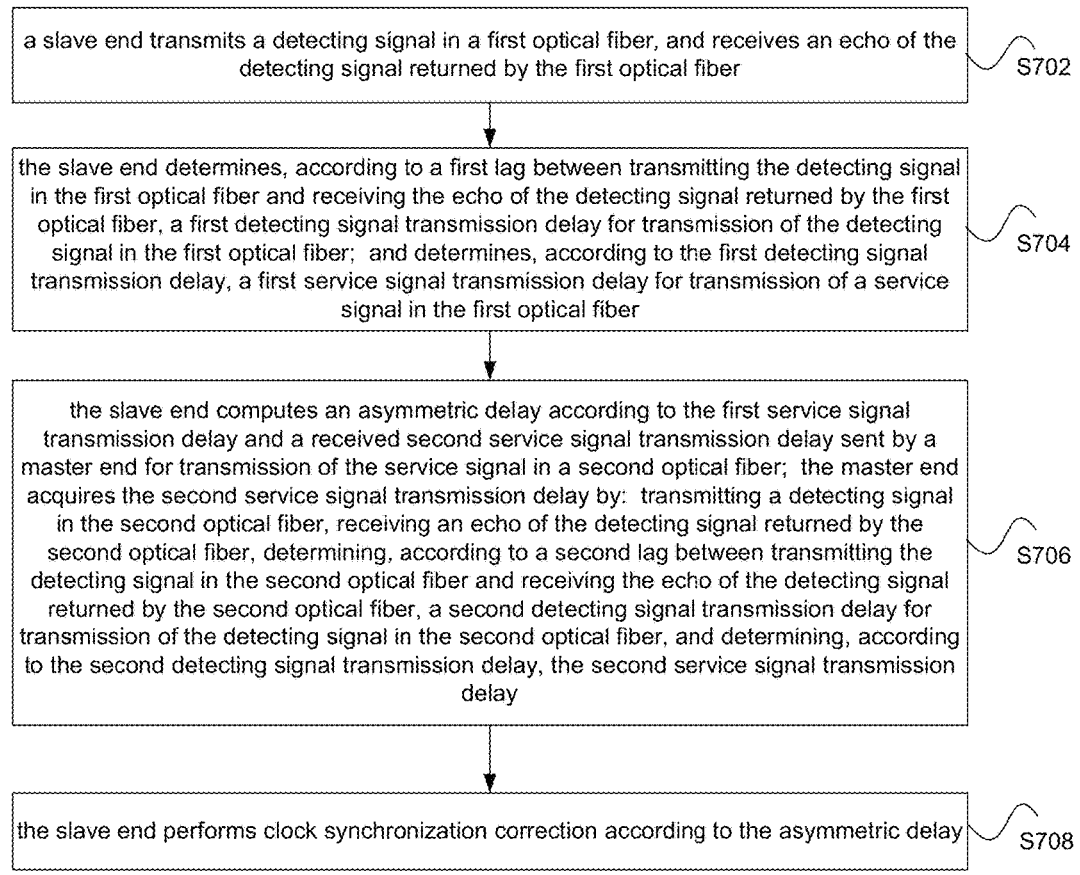
FIG. 8 is a flowchart of a clock synchronization method with automatic optical fiber asymmetry detection based on unidirectional sending according to an embodiment herein.

FIG. 8 is a flowchart of a clock synchronization method with automatic bidirectional asymmetry detection based on unidirectional sending according to an embodiment herein. As shown in FIG. 8, the method may include steps as follows.

In step S702, a slave end transmits a detecting signal in a first optical fiber, and receives an echo of the detecting signal returned by the first optical fiber.

In step S704, the slave end determines, according to a first lag between transmitting the detecting signal in the first optical fiber and receiving the echo of the detecting signal returned by the first optical fiber, a first detecting signal transmission delay for transmission of the detecting signal in the first optical fiber; and determines, according to the first detecting signal transmission delay, a first service signal transmission delay for transmission of a service signal in the first optical fiber.

In step S706, the slave end computes an asymmetric delay according to the first service signal transmission delay and a received second service signal transmission delay sent by a master end for transmission of the service signal in a second optical fiber. The master end acquire the second service signal transmission delay by: transmitting a detecting signal in the second optical fiber, receiving an echo of the detecting signal returned by the second optical fiber, determining, according to a second lag between transmitting the detecting signal in the second optical fiber and receiving the echo of the detecting signal returned by the second optical fiber, a second detecting signal transmission delay for transmission of the detecting signal in the second optical fiber, and determining, according to the second detecting signal transmission delay, the second service signal transmission delay.

In step S708, the slave end performs clock synchronization correction according to the asymmetric delay.

The first optical fiber may be a transmitting fiber of the slave end and a receiving fiber of the master end and the second optical fiber may be a receiving fiber of the slave end and a transmitting fiber of the master end. Alternatively, the first optical fiber may be a transmitting fiber of the master end and a receiving fiber of the slave end and the second optical fiber may be a receiving fiber of the master end and a transmitting fiber of the slave end.

With an aforementioned solution, by cooperating with a clock synchronization apparatus with automatic optical fiber asymmetry detection at a master end, a slave end may acquire both the first service signal transmission delay and the second service signal transmission delay to determine an inter-fiber asymmetric delay for performing clock synchronization correction, reducing impact of bidirectional optical fiber asymmetry, improving accuracy in clock synchronization in spite of bidirectional length asymmetry.

In determining the first detecting signal transmission delay according to the first lag between transmitting the detecting signal in the first optical fiber and receiving the echo of the detecting signal returned by the first optical fiber, and determining the first service signal transmission delay according to the first detecting signal transmission delay, the method may include step as follows. The first detecting signal transmission delay $P11=(t21-t11)/2$ may be determined. The $t21$ may be a first echo time when receiving the echo of the detecting signal returned by the first optical fiber. The $t11$ may be a first transmitting time when transmitting the detecting signal in the first optical fiber. The first service signal transmission delay $P21=(n21/n11) \times P11$ may be determined. The $n21$ may be an index of refraction of the first optical fiber for the service signal. The $n11$ may be an index of refraction of the first optical fiber for the detecting signal. In determining the second detecting signal transmission delay according to the second lag between transmitting the detecting signal in the second optical fiber and receiving the echo of the detecting signal returned by the second optical fiber, and determining the second service signal transmission delay according to the second detecting signal transmission delay, the method may include step as follows. The second detecting signal transmission delay $P12=(t22-t12)/2$ may be determined. The $t22$ may be a second echo time when receiving the echo of the detecting signal returned by the second optical fiber. The $t12$ may be a second transmitting time when transmitting the detecting signal in the second optical fiber. The second service signal transmission delay $P22=(n22/n12) \times P12$ may be determined. The $n22$ may be an index of refraction of the second optical fiber for the service signal. The $n12$ may be an index of refraction of the second optical fiber for the detecting signal.

In step S706, the asymmetric delay $M=P21-P22$ between the first optical fiber and the second optical fiber may be computed.

In step S708, a timestamp counter may record clock synchronization message timestamps $T1$, $T2$, $T3$, and $T4$; an asymmetric delay compensation $Offset=[(A-B)+M]/2$ may be computed, with $A=T2-T1$, and $B=T4-T3$; and clock synchronization correction may be performed according to the asymmetric delay compensation.

With the method, combining 1588 timestamps $T1$, $T2$, $T3$, and $T4$, a system time may be corrected.

When the first optical fiber is a transmitting fiber of the slave end and the second optical fiber is a transmitting fiber of the master end, the slave end may multiplex the service signal and the detecting signal and send the multiplexed signal of the service signal and the detecting signal in the first optical fiber. The transmitting fiber side of the slave end may receive a reflected signal via a WDM demultiplexing apparatus. An OTDR detecting signal may be extracted from the reflected signal and then delivered to the OTDR asymmetry detecting module. The master end may multiplex the service signal and the detecting signal, and send the multiplexed signal of the service signal and the detecting signal in the second optical fiber. The transmitting fiber side of the master end may receive a reflected signal via a WDM demultiplexing apparatus. An OTDR detecting signal may be extracted from the reflected signal and then delivered to the OTDR asymmetry detecting module. A frequency of a detecting signal may differ from a frequency of a service signal.

With the method, both a slave end and a master end may send a service message while performing asymmetry detection, implementing online clock synchronization.

Part of a transmitted OTDR asymmetry detecting signal may return, by scattering and reflection, to a local (master or slave end) OTDR asymmetry detecting module for subsequent processing. To allow more of the detecting signal to be returned to the OTDR asymmetry detecting module, when the first optical fiber is a transmitting fiber of the slave end and the second optical fiber is a transmitting fiber of the master end, the method may further include steps as follows. When a multiplexed signal of the service signal and the detecting signal sent by the slave end is received from the first optical fiber, the detecting signal may be reflected by the master end at an optical fiber connector connecting the first optical fiber using a fixed wavelength reflecting sheet. When a multiplexed signal of the service signal and the detecting signal sent by the master end is received from the second optical fiber, the detecting signal may be reflected by the slave end at an optical fiber connector connecting the second optical fiber using a fixed wavelength reflecting sheet. With the method, the amount of echoed detecting signal may be increased, such that OTDR asymmetry detecting modules at both ends may determine a transmission delay more accurately.

A method illustrated in a method embodiment may be implemented using an apparatus illustrated in an apparatus embodiment.

In aforementioned method and apparatus embodiments, a detecting signal may be a detecting optical pulse. In aforementioned method and apparatus embodiments, a service signal may be a service optical pulse. In aforementioned method and apparatus embodiments, a frequency of a detecting optical pulse may differ from a frequency of a service optical pulse.

Embodiments of a solution in aforementioned method and apparatus embodiments may be elaborated with an example in which a detecting signal is a detecting optical pulse and a service signal is a service optical pulse. The embodiments are not intended to limit the protection scope of the disclosure.

Embodiment 1

In the embodiment, a clock synchronization apparatus with automatic optical fiber asymmetry detection may include an optical module apparatus, an OTDR asymmetry detecting apparatus, a delay compensating module, a time correcting module, and a the 1588 protocol module. The optical module apparatus and the 1588 protocol module may be part of the clock synchronization apparatus with automatic optical fiber asymmetry detection. Illustration of the OTDR asymmetry detecting apparatus, the delay compensating module, and the clock synchronization correcting module, as part of the disclosure, will be highlighted.

To implement automatic bidirectional optical fiber asymmetry detection, first make sure that system clocks at both NEs (a master and a slave) are frequency synchronized. On this basis, message transceiving frequencies at the master NE and the slave NE are consistent. Asymmetric delay data may be extracted by the slave end to perform bidirectional optical fiber asymmetric delay compensation and clock synchronization correction.

The following may be performed at the slave end.

The optical module apparatus may perform sending with a normal service wavelength.

The OTDR asymmetry detecting apparatus may send an OTDR asymmetry detecting optical pulse (using a wavelength in a wavelength range different from that of a normal service optical pulse). For example, the OTDR optical pulse may use a wavelength of 1625 nm and the normal service optical pulse may use a wavelength of 1310 nm or 1550 nm.

The OTDR optical pulse may be sent in a single direction. For example, the OTDR asymmetry detecting optical pulse may be sent only at a transmitting fiber side or a receiving fiber side. The OTDR optical pulse may be sent in both directions. For example, the OTDR asymmetry detecting optical pulse may be sent at both a transmitting fiber side and a receiving fiber side.

In the embodiment, the OTDR asymmetry detecting optical pulse may be sent at a transmitting fiber side of a slave NE and a transmitting fiber side of a master NE.

With a WDM apparatus, optical pulses of different wavelengths may be multiplexed and sent to an opposite device (the master end).

Part of an OTDR detecting optical pulse transmitted in an optical fiber may be returned to a local (master or slave end) OTDR asymmetry detecting module by scattering and reflection. In addition, a fixed wavelength reflecting sheet for the wavelength of an OTDR optical pulse may be added at a receiving fiber connector of an opposite device (master end) to reflect a detecting optical pulse arriving at the master end. With the method, the amount of echoed detecting optical pulse may be increased, such that an OTDR asymmetry detecting module at a slave end may determine a transmission delay more accurately.

A receiving fiber side of a master or slave may extract, using a WDM apparatus, the OTDR asymmetry detecting optical pulse and the normal service optical pulse.

A transmitting fiber side of a slave end may receive a reflected signal via a WDM demultiplexing apparatus. An OTDR detecting signal may be extracted from the reflected signal and then delivered to the OTDR asymmetry detecting module. A sampling frequency may be set for the OTDR asymmetry detecting apparatus to receive OTDR returned information with a frequency. An optical fiber delay may be learned according to a period of time between transmitting a signal and receiving the OTDR returned information. A transmission delay for transmission of a service optical pulse in an optical fiber may be learned by comparing indices of refraction for the detecting optical pulse and the service optical pulse.

An asymmetric delay compensation module at a slave end may compute, according to transmission delays in both optical fiber directions, a bidirectional optical fiber asymmetric delay to obtain an asymmetric difference in the delays of the optical fiber. The asymmetric difference in the delays may be fed back to the clock synchronization correcting module.

A clock synchronization correcting module at a slave end may compute, according to an asymmetric difference of a bidirectional optical fiber and 1588 protocol timestamps T1, T2, T3, and T4, bidirectional asymmetric delay compensation, such that a slave NE tracks the time at a master NE, achieving 1588 clock synchronization.

In the embodiment, an OTDR asymmetry detecting apparatus may send an OTDR asymmetry detecting optical pulse (using a wavelength in a wavelength range different from that of a normal service optical pulse). Using OTDR technology, a asymmetric transmission delays in both optical fiber directions between clock synchronization NEs (master and slave NEs) may be detected online. A slave NE may compute a bidirectional optical pulse asymmetric delay and perform optical fiber asymmetric delay compensation in 1588 clock synchronization accordingly, such that the slave NE tracks the time at the master NE. This provides a solution for asymmetry compensation in 1588 clock synchronization in an existing network. Bidirectional optical fiber asymmetry detection may be performed online using OTDR technology. Regarding issues such as transmission attenuation, joint attenuation, aging of an optical fiber, an optical fiber transmission delay may be learned at any time via OTDR asymmetry detection to adjust the optical fiber asymmetric delay compensation in 1588 clock synchronization at a slave end in time, increasing accuracy in clock synchronization, meeting a demand of a wireless TDD service for clock synchronization.

Embodiment 2

Figure 9:
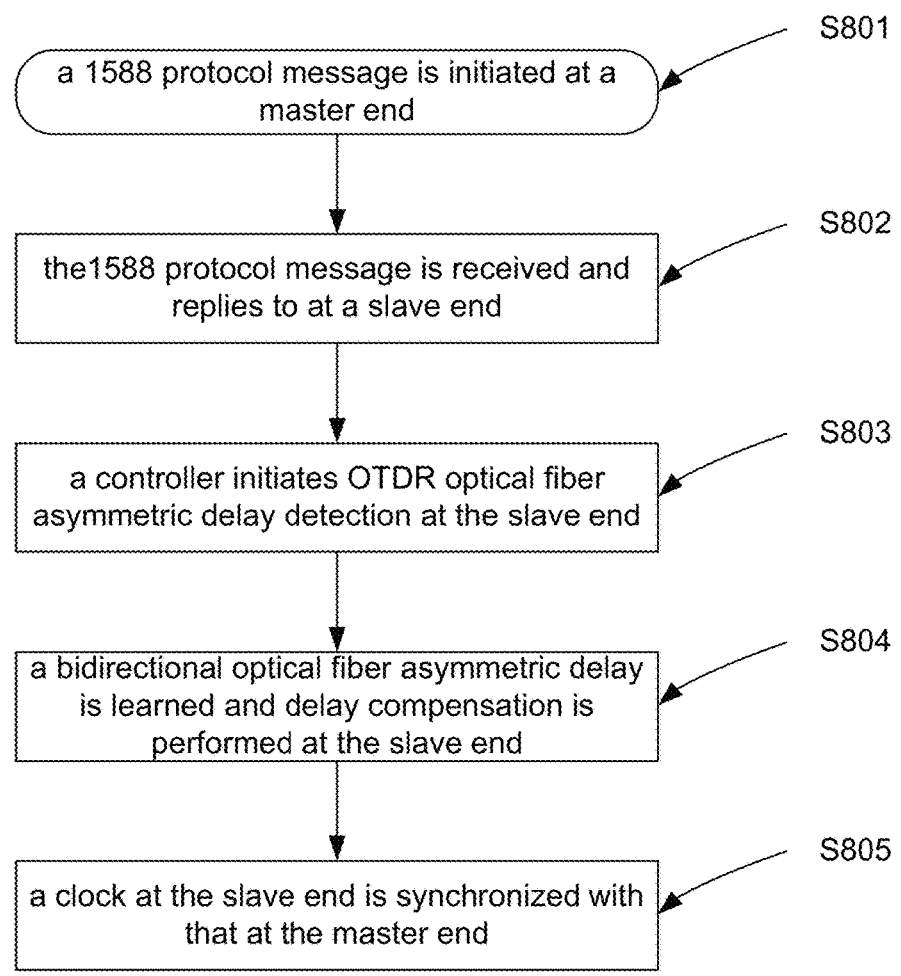
FIG. 9 is a flowchart of automatic optical fiber asymmetry detection according to an Embodiment 2 herein.

FIG. 9 is a flowchart of automatic optical fiber asymmetry detection according to an Embodiment 2 herein. As shown in FIG. 9, the solution for automatic optical fiber asymmetry detection may include steps as follows.

In step S801, a 1588 protocol message is initiated at a master end. The message normally may be processed by an optical module and then sent to a slave end.

In step S802, the 1588 protocol message is received and replies to at a slave end. A timestamp thereof may be recorded. The message normally may be processed by an optical module, and sent, with a normal service message wavelength, to the master end.

In step S803, a controller initiates OTDR optical fiber asymmetric delay detection at the slave end. An OTDR asymmetry detecting apparatus may send an OTDR optical pulse. An asymmetric delay between both optical fiber directions, i.e, a bidirectional optical fiber asymmetric delay, may be detected online.

In step S804, a bidirectional optical fiber asymmetric delay is learned and delay compensation is performed at the slave end.

In step S805, a clock at the slave end is synchronized with that at the master end.

Steps S801 and S802 are part of normal 1588 message exchange, which may be combined with 1588 message exchange to complete bidirectional optical fiber asymmetric delay compensation.

Embodiment 3

Figure 10:
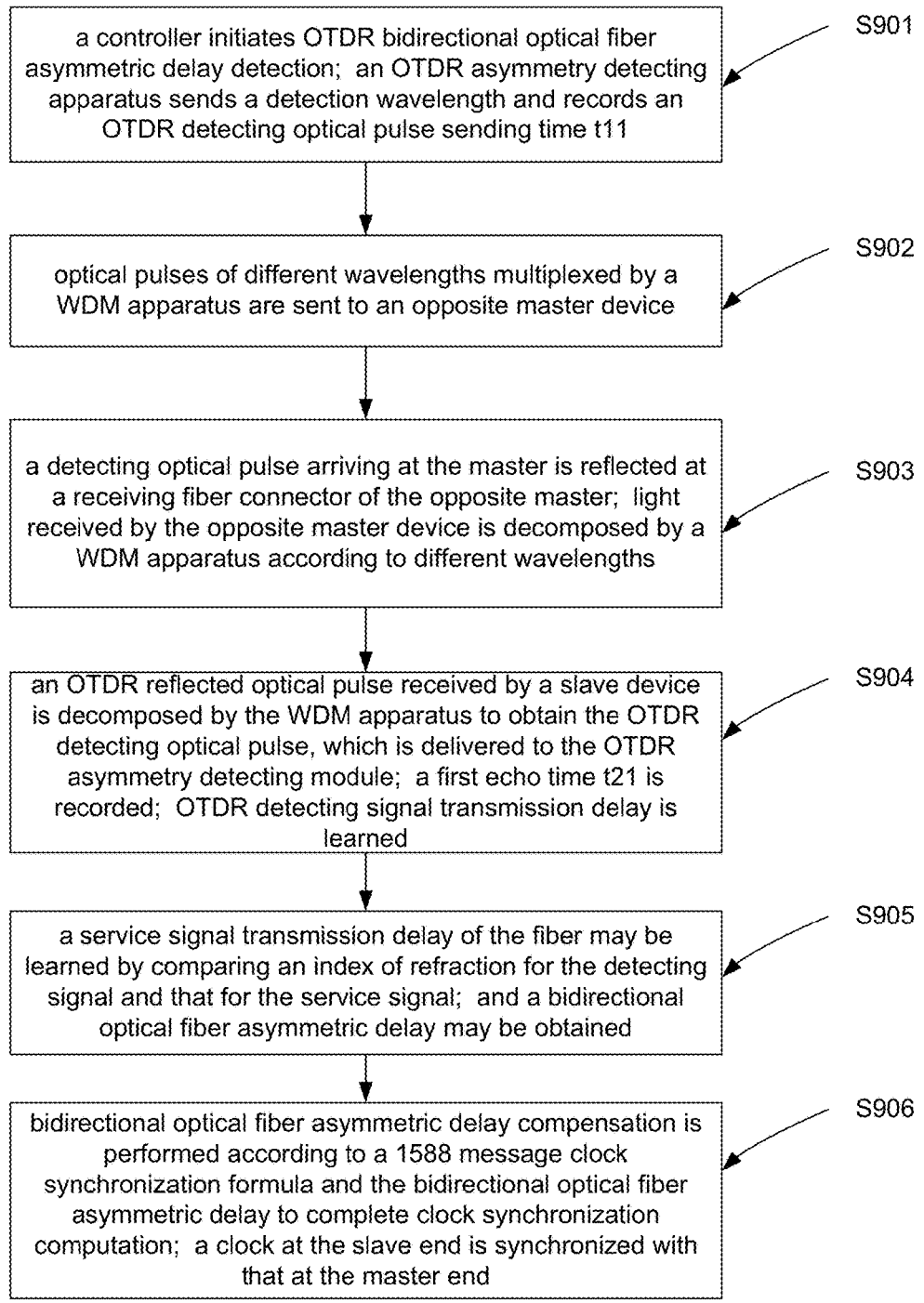
FIG. 10 is a flowchart of OTDR optical fiber asymmetric delay detection at a slave end according to an Embodiment 3 herein.

FIG. 10 is a flowchart of OTDR optical fiber asymmetric delay detection at a slave end according to an Embodiment 3 herein. As shown in FIG. 10, the flow may include steps as follows.

In step S901, a controller initiates OTDR optical fiber asymmetric delay detection. An OTDR asymmetry detecting apparatus sends a detection wavelength and records an OTDR detecting optical pulse sending time t11.

An OTDR optical pulse may be sent in a single direction. For example, an OTDR asymmetry detecting optical pulse may be sent only at a transmitting fiber side or a receiving fiber side. Alternatively, the OTDR optical pulse may be sent in both directions. For example, an OTDR asymmetry detecting optical pulse may be sent at both a transmitting fiber side and a receiving fiber side.

In step S902, optical pulses of different wavelengths (a normal service message optical pulse and an OTDR asymmetry detecting optical pulse) multiplexed by a WDM apparatus are sent to an opposite master device.

In step S903, a fixed wavelength reflecting sheet for the wavelength of an OTDR optical pulse may be added at a receiving fiber connector of the master to reflect a detecting optical pulse arriving at the master end. With the method, the amount of echoed detecting optical pulse may be increased, such that OTDR asymmetry detecting modules at both ends may determine a transmission delay more accurately. Light received by the opposite master device may be decomposed by a WDM apparatus according to different wavelengths.

In step S904, a transmitting fiber side of a slave device may receive a reflected signal via a WDM demultiplexing apparatus. An OTDR detecting signal may be extracted from the reflected signal and then delivered to the OTDR asymmetry detecting module. A reflected OTDR optical pulse is received. A returning time t21 thereof may be recorded. With the difference t21−t11, an optical pulse transmission delay detected at the transmitting fiber side of the slave is P11=(t21−t11)/2.

In step S905, a service signal transmission delay of the fiber may be learned by comparing an index of refraction for the detecting signal and that for the service signal.

For example,
the OTDR asymmetry detecting signal transmitting time=t11;
the OTDR asymmetry detecting signal returning time=t21;
the OTDR optical pulse transmission delay P11=(t21−t11)/2;
the index of refraction of the optical fiber for the OTDR optical pulse=n11;
the index of refraction of the optical fiber for the normal service message optical pulse=n21;

By comparing an index of refraction for the detecting signal and that for the service signal, a normal service message transmission delay of the fiber may be learned:

$P21=(n21/n11) \times P11$

There may be quite a few parameters or factors, such as an index of refraction, scattering, reflection, and the like, that may impact a delay of transmission of an optical pulse in an optical fiber. However, a delay of transmission of a normal message in an optical fiber is mainly to be compared with that of an OTDR optical pulse. Thus, part of the parameter impact may cancel each other out. The formula may have an error, which though is relatively small. In addition, errors for both optical fiber directions may cancel each other out and thus is negligible.

In step S906, bidirectional optical fiber asymmetric delay compensation is performed according to a normal 1588 message clock synchronization formula and the bidirectional optical fiber asymmetric delay to complete clock synchronization computation. A clock at the slave end may then be synchronized with that at the master end.

Embodiment 4

Figure 11:
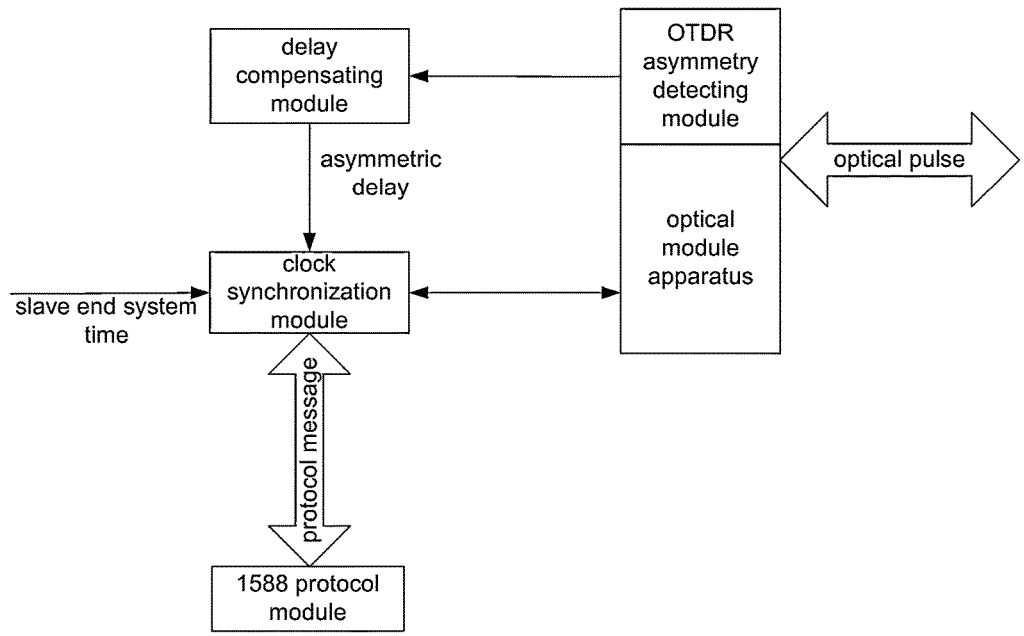
FIG. 11 is a schematic diagram of a clock synchronization apparatus with automatic optical fiber asymmetry detection at a slave end according to an Embodiment 4 herein.

FIG. 11 is a schematic diagram of a clock synchronization apparatus with automatic optical fiber asymmetry detection at a slave end according to an Embodiment 4 herein. As shown in FIG. 11, the apparatus mainly may include a 1588 protocol module, a clock synchronization module, a delay compensating module, an optical module apparatus, an OTDR asymmetry detecting module.

As shown in FIG. 9, the 1588 protocol module may generate a protocol message according to the 1588 protocol. Protocol message transceiving may be performed using the clock synchronization module. The clock synchronization module may record a 1588 message timestamp according to a category of the 1588 message.

At a master end, a Sync message may record a timestamp T1; a Delay_Resp message may record a timestamp T4.

At the slave end, a Sync message may record timestamps T1, T2; a Delay_req message may record a timestamp T3; a Delay_resp message may record the timestamp T4. Finally, the clock synchronization module at the slave end may record 1588 timestamps T1/T2/T3/T4.

Reference time of the clock synchronization module may be system time.

1588 protocol message exchange between the master end and the slave end may be part of normal service message exchange. A timestamp-including 1588 message may be transceived by the optical module, and sent as a normal service message, which is not elaborated herein.

At the slave end, a controller may control the OTDR asymmetry detecting apparatus to send an OTDR asymmetry detecting optical pulse with a wavelength differing from that of a normal service message. For example, the wavelength of the OTDR asymmetry detecting optical pulse may be 1625 nm, while the wavelength of a normal service message optical pulse may be 1310 nm or 1550 nm. The two optical wavelengths may be multiplexed using a WDM apparatus and sent in an optical fiber.

In addition, a time t11 of sending the OTDR asymmetry detecting optical pulse may be recorded.

A fixed wavelength reflecting sheet for the wavelength of an OTDR optical pulse may be added at a receiving fiber connector of the master to reflect a detecting optical pulse arriving at the master end. With the method, the amount of echoed detecting optical pulse may be increased, such that OTDR asymmetry detecting modules at both ends may determine a transmission delay more accurately. The opposite master device may extract, using a WDM apparatus, the OTDR asymmetry detecting optical pulse and the normal service optical pulse.

At a transmitting fiber side of the slave end, a reflected signal may be received via a WDM demultiplexing apparatus. An OTDR detecting signal may be extracted from the reflected signal and then delivered to the OTDR asymmetry detecting module. The OTDR asymmetry detecting apparatus may receive OTDR returned optical information. A sampling frequency may be set to receive OTDR returned information with a frequency. An OTDR asymmetry detecting optical pulse returning time t21 may be recorded. A delay of transmission of the OTDR asymmetry detecting optical pulse in the optical fiber may be learned according to a period of time between transmitting the signal and receiving the OTDR returned information.

By comparing an index of refraction for a detecting wavelength and an index of refraction for a service wavelength, the delay of transmission of the service wavelength in the optical fiber may be learned.

The OTDR optical pulse may be sent in a single direction. For example, the OTDR asymmetry detecting optical pulse may be sent only at a transmitting fiber side of the master end and a transmitting fiber side of the slave end, or only at a receiving fiber side of the master end and a receiving fiber side of the slave end. The OTDR optical pulse may be sent in both directions. For example, the OTDR asymmetry detecting optical pulse may be sent at both a transmitting fiber side and a receiving fiber side of the slave end.

Figure 12:
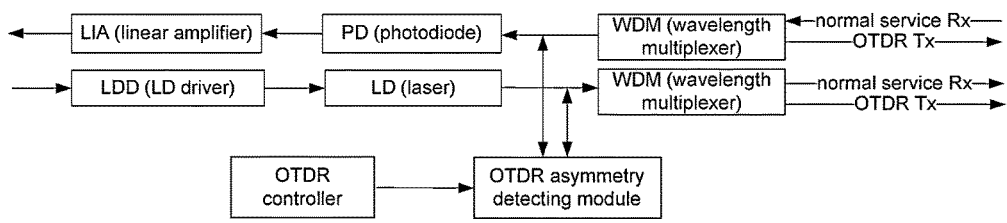
FIG. 12 is a first schematic diagram of an apparatus integrating an optical module and an OTDR asymmetry detecting module at a slave end according to an Embodiment 4 herein.
Figure 13:
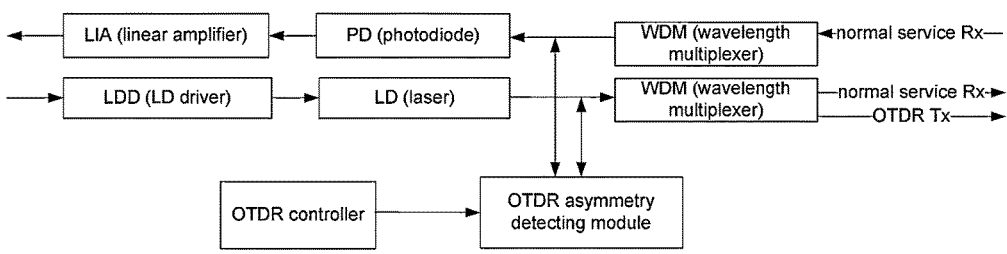
FIG. 13 is a second schematic diagram of an apparatus integrating an optical module and an OTDR asymmetry detecting module at a slave end according to an Embodiment 4 herein.

FIG. 12 and FIG. 13 are schematic diagrams of an apparatus integrating an optical module and an OTDR asymmetry detecting module at a slave end according to the Embodiment 4 herein. The apparatus in FIG. 12 is bidirectional, which means that an OTDR asymmetry detecting optical pulse may be sent at both a transmitting fiber side and a receiving fiber side. The apparatus in FIG. 13 is unidirectional, which means that an OTDR asymmetry detecting optical pulse may be sent only at a transmitting fiber side or a receiving fiber side.

An normal service optical pulse may go through an LD driver and a laser, and then sent to a WDM apparatus with a wavelength of 1310 nm or 1550 nm.

An OTDR controller may instruct the OTDR asymmetry detecting apparatus to send, with a wavelength of 1625 nm, an OTDR asymmetry detecting optical pulse to a WDM apparatus.

Having gone through the WDM apparatus, the symmetry detecting optical pulse may be sent, together with a normal service message transmitted by the optical module, in an optical fiber.

Figure 14:
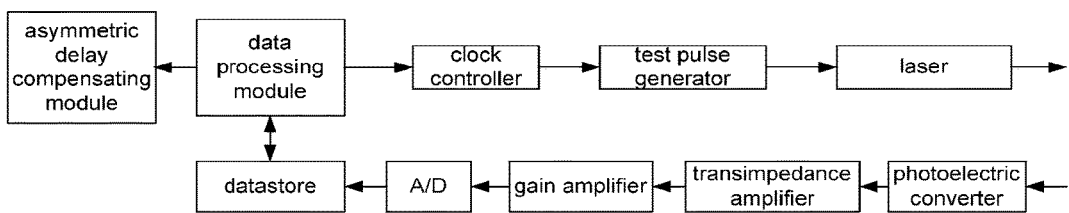
FIG. 14 is a schematic diagram of an OTDR asymmetry detecting module at a slave end according to an Embodiment 4 herein.

FIG. 14 is a schematic diagram of an OTDR asymmetry detecting module at a slave end according to an Embodiment 4 herein. The module may be configured mainly for processing an OTDR asymmetry detecting optical pulse.

First, a data processing module may initiate an OTDR asymmetry detecting signal, and record a signal transmitting time t11 thereof. Having gone through a clock controller, a test pulse generator, a photoelectric conversion and the like, the signal may then be loaded by a laser onto a wave with a wavelength of 1625 nm to send out an OTDR asymmetry detecting optical pulse.

The OTDR asymmetry detecting optical pulse and a normal service optical pulse, having gone through a WDM apparatus, may be sent in an optical fiber. The OTDR optical pulse may returned to a local (slave end) OTDR asymmetry detecting apparatus by scattering and reflection.

At the slave end, a transmitting fiber side may receive a reflected signal via a WDM demultiplexing apparatus. An OTDR detecting signal may be extracted from the reflected signal and then delivered to the OTDR asymmetry detecting module. The OTDR asymmetry detecting apparatus may receive OTDR returned optical information. A sampling frequency may be set to receive OTDR returned information with a frequency. After photoelectric conversion, signal amplification, and A/D conversion, OTDR detecting data (i.e., optical fiber medium information such as a propagation speed of light in the optical fiber, an index of refraction of an optical fiber or the like) may be obtained. The OTDR returned information may be fed back to the data processing module, and a signal returning time t21 thereof may be recorded. An optical fiber transmission delay may be computed.

For example, the OTDR asymmetry detecting signal transmitting time=t11;

the OTDR asymmetry detecting signal returning time=t21;

the OTDR optical pulse transmission delay P11=(t21−t11)/2;

the index of refraction of the optical fiber for the OTDR optical pulse=n11;

the index of refraction of the optical fiber for the normal service message optical pulse=n21;

By comparing an index of refraction for the detecting signal and that for the service signal, a normal service message transmission delay of the fiber may be learned:

$$P21=(n21/n11)\times P11$$

There may be quite a few parameters or factors, such as an index of refraction, scattering, reflection, and the like, that may impact a delay of transmission of an optical pulse in an optical fiber. However, a delay of transmission of a normal message in an optical fiber is mainly to be compared with that of an OTDR optical pulse. Thus, part of the parameter impact may cancel each other out. The formula may have an error, which though is relatively small. In addition, errors for both optical fiber directions may cancel each other out and thus is negligible.

Likewise, a normal service optical pulse transmission delay P22=(n22/n12)×P12 of the other optical fiber may be learned.

The t22 may be the time when the master receives the detecting optical pulse.

The t12 may be the time when the master transmits the detecting optical pulse.

The transmission delay of the detecting optical pulse at a transmitting fiber side of the master may be P12=(t22−t12)/2.

The n12 may be the index of refraction of the transmitting fiber side of the master for the detecting optical pulse.

The n22 may be the index of refraction of the transmitting fiber side of the master for the service optical pulse.

Then, the transmission delay of the service optical pulse at a transmitting fiber side of the master may be P22=(n22/n12)×P12.

Figure 15:
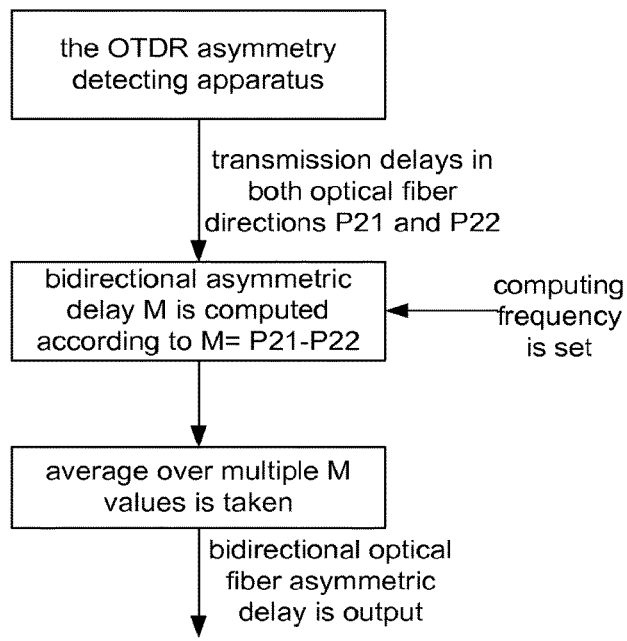
FIG. 15 is a schematic diagram of asymmetric delay compensation module at a slave end according to an Embodiment 4 herein.

FIG. 15 is a schematic diagram of asymmetric delay compensation module at a slave end according to an Embodiment 4 herein.

At a slave end, an OTDR asymmetry detecting module may feed transmission delays P21 and P22 in both optical fiber directions back to an asymmetric delay compensation module.

The asymmetric delay compensation module may compute, according to transmission delays P21 and P22 in both directions, a bidirectional optical fiber asymmetric delay M. In addition, a computing frequency (that is, bidirectional asymmetric delay computations to be performed per second) may be set.

The bidirectional optical fiber asymmetric delay M=P21−P22.

An average of multiple asymmetric delays M may be fed back to a clock synchronization correcting module.

Figure 16:
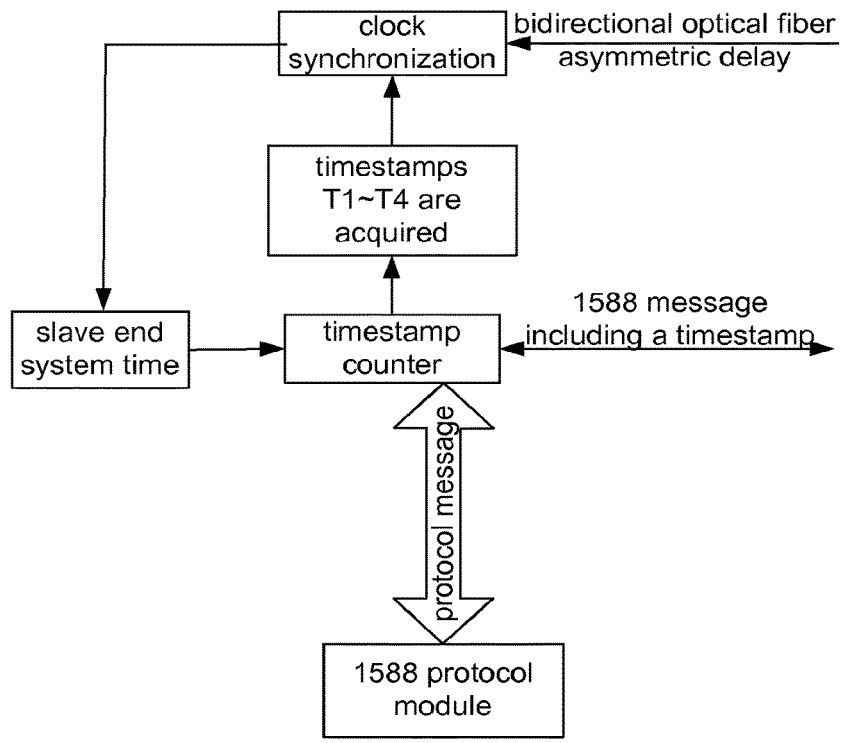
FIG. 16 is a schematic diagram of a clock synchronization correcting module at a slave end according to the Embodiment 4 herein.

FIG. 16 is a schematic diagram of a clock synchronization correcting module at a slave end according to the Embodiment 4 herein.

At a slave end, a clock synchronization correcting module may correct system time mainly according to a bidirectional optical fiber asymmetric delay M. The clock synchronization correcting module may further include a timestamp counter. Both the time and clock of the timestamp counter may be the system time and system clock.

The following may be based on a formula for normal 1588 clock synchronization.

A protocol message of a 1588 protocol module may go through the timestamp counter. A timestamp thereof may be recorded according to a category of the message.

At a master end, a Sync message may record a timestamp T1, and a Delay_Resp message may record a timestamp T4.

At the slave end, a Sync message may record timestamps T1, T2, a Delay_req message may record a timestamp T3, a Delay_resp message may record a timestamp T4.

Finally, the slave end may obtain message delivery timestamps T1, T2, T3, and T4 according to normal 1588 protocol message exchange between the master end and the slave end. Timestamps T1, T2, T3, and T4 acquired by the timestamp counter at the slave end may be fed back to the clock synchronization correcting module. The clock synchronization correcting module may compute a time compensation according to the obtained bidirectional optical fiber asymmetric delay M, and timestamps T1, T2, T3, and T4, such that a slave NE tracks the time at the master NE, achieving 1588 clock synchronization.

Embodiment 5

Figure 17:
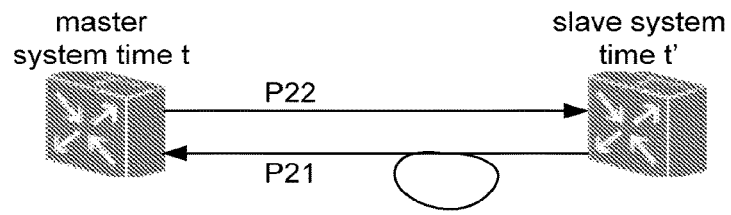
FIG. 17 is a schematic diagram of clock synchronization with automatic optical fiber asymmetry detection according to an Embodiment 5 herein.

FIG. 17 is a schematic diagram of clock synchronization with automatic optical fiber asymmetry detection according to an Embodiment 5 herein. As shown, bidirectional optical fiber length asymmetry at a master and a slave, delays of transmission of a 1588 message may differ too.

Assume that an optical fiber transmission delay at a sending end of the slave end is P21, and an optical fiber transmission delay at a sending end of the master end is P22.

When an optical pulse is delivered in an optical fiber, other than bidirectional optical fiber length asymmetry, issues such as transmission attenuation, joint attenuation, aging of an optical fiber and the like may also cause a bidirectional optical fiber asymmetric delay.

What shown in FIG. 17 may include the two scenes as follows.

In scene (1), an OTDR asymmetry detecting optical pulse may be sent at a transmitting fiber side or a receiving fiber side.

In scene (2), an OTDR asymmetry detecting optical pulse may be sent at both a transmitting fiber side and a receiving fiber side.

In scene (1), an OTDR asymmetry detecting optical pulse may be sent only at a transmitting fiber side or a receiving fiber side (a transmitting fiber side here as an example, as a case of a receiving fiber side may be implemented likewise).

An OTDR asymmetry detecting apparatus may be integrated at both master and slave NEs. Bidirectional optical fiber length asymmetry may be detected online. Regarding a bidirectional optical fiber asymmetric delay M caused by issues such as transmission attenuation, joint attenuation, aging of an optical fiber and the like, finally, time at a slave may be synchronized to time at the master. Asymmetric delay compensation may be performed according to the bidirectional optical fiber asymmetric delay.

First, the master end initiates a 1588 protocol message. A clock synchronization module may record a 1588 message timestamp thereof. The message normally may be processed by an optical module, and sent, with a normal service message wavelength, to the slave end.

The slave end may receive and reply to the 1588 protocol message. A clock synchronization module may record a 1588 message timestamp thereof. The message normally may be processed by an optical module, and sent, with a normal service message wavelength, to the master end.

During master-slave 1588 message exchange, a clock synchronization module may record a 1588 message timestamp T1/T2/T3/T4, which as part of normal 1588 message exchange may be combined with 1588 message exchange to complete bidirectional optical fiber asymmetric delay compensation.

A clock synchronization correcting module, a delay compensating module, and an OTDR asymmetry detecting module may be integrated in both a master and a slave end.

The following flow may be at a slave end.

A controller may control the OTDR asymmetry detecting apparatus to send a detecting signal and record a transmitting time t11. Assume that an OTDR detecting signal uses a wavelength of 1625 nm. A normal 1588 protocol message and an OTDR asymmetry detecting optical pulse may go through a WDM apparatus and then be delivered in an optical fiber.

Part of the OTDR optical pulse may return to the OTDR asymmetry detecting apparatus at the slave end by scattering and reflection.

The OTDR asymmetry detecting apparatus may receive OTDR returned information with a frequency. OTDR detecting data may be obtained after photoelectric conversion, signal amplification, and A/D conversion. An information returning time t21 may be recorded and fed back to a data processing module. An optical fiber transmission delay may be computed.

For example, the OTDR asymmetry detecting signal transmitting time=t11;

the OTDR asymmetry detecting signal returning time=t21;

the OTDR optical pulse transmission delay P11=(t21−t11)/2;

the index of refraction of the optical fiber for the OTDR optical pulse=n11; and the index of refraction of the optical fiber for the normal service message optical pulse=n21.

By comparing an index of refraction for the detecting signal and that for the service signal, a normal service message transmission delay of the fiber may be learned:

$$P21=(n21/n11) \times P11$$

There may be quite a few parameters or factors, such as an index of refraction, scattering, reflection, and the like, that may impact a delay of transmission of an optical pulse in an optical fiber. However, a delay of transmission of a normal message in an optical fiber is mainly to be compared with that of an OTDR optical pulse. Thus, part of the parameter impact may cancel each other out. The formula may have an error, which is relatively small though, and thus is negligible Likewise, the master end also may learned an optical fiber transmission delay $P22=(n22/n12) \times P12$ at a sending side.

The t22 may be the time when the master receives the detecting optical pulse.

The t12 may be the time when the master transmits the detecting optical pulse.

The transmission delay of the detecting optical pulse at a transmitting fiber side of the master may be $P12=(t22-t12)/2$.

The n12 may be the index of refraction of the transmitting fiber side of the master for the detecting optical pulse.

The n22 may be the index of refraction of the transmitting fiber side of the master for the service optical pulse.

Then, the transmission delay of the service optical pulse at a transmitting fiber side of the master may be $P22=(n22/n12) \times P12$.

As both the master end and the slave end each detect a local sending side optical fiber transmission delay, the slave end only knows a local sending side optical fiber transmission delay P21. The master side further has to send a local sending side optical fiber transmission delay P22 to the slave end.

Then, the OTDR asymmetry detecting module at the slave end may feed transmission delays P21 and P22 in both optical fiber directions back to the asymmetric delay module.

In a 1588 clock synchronization system, a slave end performs asymmetric delay compensation.

At a slave end, an OTDR asymmetry detecting module may feed transmission delays P21 and P22 in both optical fiber directions back to an asymmetric delay compensation module.

The asymmetric delay compensation module may compute, according to transmission delays P21 and P22 in both directions, a bidirectional optical fiber asymmetric delay M. In addition, a computing frequency (that is, bidirectional asymmetric delay computations to be performed per second) may be set.

The bidirectional optical fiber asymmetric delay M=P21−P22.

An average of multiple asymmetric delays M may be fed back to a clock synchronization correcting module.

The clock synchronization correcting module may correct system time mainly according to the bidirectional optical fiber asymmetric delay M. The clock synchronization correcting module may further include a timestamp counter. Both the time and clock of the timestamp counter may be the system time and system clock.

The following may be based on normal 1588 protocol message exchange between a master end and a slave end.

A protocol message of a 1588 protocol module may go through the timestamp counter. A timestamp thereof may be recorded according to a category of the message.

At the master end, a Sync message may record a timestamp T1, and a Delay_Resp message may record a timestamp T4.

At the slave end, a Sync message may record timestamps T1, T2, a Delay_req message may record a timestamp T3, and a Delay_resp message may record a timestamp T4.

Finally, the slave end may obtain message delivery timestamps T1, T2, T3, and T4. Timestamps T1, T2, T3, and T4 acquired by the timestamp counter at the slave end may be fed back to the clock synchronization correcting module.

The clock synchronization correcting module may use a clock synchronization formula in a standard 1588 protocol as follows.

$$\text{inter-master-slave lag} = \text{Offset} + MS\_Delay = T2 - T1 \quad (1)$$

$$\text{inter-slave-master lag} = SM\_Delay - \text{Offset} = T4 - T3 \quad (2)$$

Assuming that A=T2−T1, B=T4−T3. An inter-master-slave link delay MS_Delay=optical fiber transmission delay P22 at the master end. An inter-slave-master delay SM_Delay=optical fiber transmission delay P21 at the slave end. Then, at the slave end, $$\text{inter-master-slave lag} = \text{Offset} + P22 = A \quad (1)$$

$$\text{inter-slave-master lag} = P21 - \text{Offset} = B \quad (2)$$

$$\text{Offset} = [(A-B) + (P21-P22)]/2;$$

that is, $\text{Offset} = [(A-B)+M]/2$

As inter-master-slave 1588 protocol message exchange continues, the slave end keeps updating the Offset according to bidirectional asymmetric delay M=P21−P22 to correct the inter-master-slave lag, such that slave time is synchronized with master time.

In scene (2), an OTDR asymmetry detecting optical pulse may be sent in both directions at both a transmitting fiber side and a receiving fiber side.

Assume that the OTDR asymmetry detecting optical pulse may be sent in both directions—at both a transmitting fiber side and a receiving fiber side, which is basically the same as the case of sending an OTDR asymmetry detecting optical pulse in a single direction, i.e. at the transmitting fiber side.

Transmission delays in both optical fiber directions may be detected directly by the slave end. A master end no longer has to send a local transmitting fiber side transmission delay to the slave end.

An apparatus and a flow remaining are the same, and will not be repeated herein.

The disclosure achieves technical effect as follows

With an embodiment herein, an OTDR asymmetry detecting module may send an OTDR asymmetry detecting optical pulse (using a wavelength in a wavelength range different from that of a normal service optical pulse). With a WDM apparatus, optical pulses of different wavelengths may be multiplexed and then sent to an opposite device. The OTDR asymmetry detecting optical pulse may return to an OTDR asymmetry detecting module in a local optical module by scattering and reflection. Inter-NE asymmetric transmission delays in both optical fiber directions may be detected online according to OTDR returned information for obtaining a bidirectional optical fiber asymmetric delay. A bidirectional asymmetric delay of the service wavelength may be obtained using a ratio of an index of refraction for an OTDR detecting wavelength to an index of refraction for a service wavelength to perform optical fiber asymmetry compensation in 1588 clock synchronization and correct system time, thus increasing accuracy in clock synchronization. With the disclosure, online automatic bidirectional optical fiber asymmetric delay analysis may be performed, an optical fiber transmission delay may be determined in time by OTDR asymmetry detection to timely adjust an optical fiber asymmetry compensation in 1588 clock synchronization, thereby increasing accuracy in time frequency synchronization, meeting a demand of a wireless TDD service for clock synchronization.

Apparently, those skilled in the art will know that modules or steps in embodiments of the disclosure may be realized using a universal computing device, and may be integrated in a single computing device or distributed in a network formed by multiple computing devices. Optionally, they may be realized using computing device executable program codes, and thus may be stored in a storage device and executed by a computing device. In some cases, the steps may be executed in an order different from that illustrated or described here, or may each be made into an Integrated Circuit module. Multiple modules or steps herein may be realized by being made into a single Integrated Circuit module. Thus, an embodiment of the disclosure is not limited to a specific combination of hardware and software.

INDUSTRIAL APPLICABILITY

With an embodiment herein, a lag between a transmitted detecting signal and a received echo of the detecting signal returned by backscattering/reflection may be measured online to determine a detecting signal transmission delay for transmission of a detecting signal in an optical fiber. Then, a service signal transmission delay for transmission of a service signal in the optical fiber may be determined. In addition, optical fiber delays in both directions may be compared. An asymmetric delay in bidirectional optical fiber transmission may be acquired according to optical fiber delays in both directions. Asymmetric delay compensation may then be performed accordingly. Such clock synchronization correction reduces impact of bidirectional optical fiber asymmetry, improving accuracy in clock synchronization in spite of bidirectional length asymmetry.

The invention claimed is:

1. A network element (NE), comprising an Optical Time Domain Reflectometer (OTDR) asymmetry detecting module, the OTDR asymmetry detecting module comprising:
   a transmitting unit configured for transmitting a detecting signal in an optical fiber;
   a receiving unit configured for receiving an echo of the detecting signal returned by the optical fiber; and
   a transmission delay determining unit configured for: determining a detecting signal transmission delay for transmission of the detecting signal in the optical fiber according to a lag between transmitting the detecting signal in the optical fiber and receiving the echo of the detecting signal returned by the optical fiber, and determining a service signal transmission delay for transmission of a service signal in the optical fiber according to the detecting signal transmission delay.

2. The NE according to claim 1, further comprising an optical module apparatus, the optical module apparatus comprising:
   a multiplexing module located at a transmitting fiber side of the NE, configured for multiplexing the service signal and the detecting signal transmitted by the transmitting unit of the OTDR asymmetry detecting module, and sending the multiplexed signal through a transmitting port of the optical module apparatus, the optical fiber being the transmitting fiber of the NE; and
   a first demultiplexing module located at the transmitting fiber side of the NE, configured for demultiplexing a signal reflected and/or scattered by the transmitting fiber to isolate the detecting signal, and sending the isolated detecting signal to the receiving unit of the OTDR asymmetry detecting module,
   wherein the optical module apparatus further comprises:
   a second demultiplexing module located at a receiving fiber side of the NE, configured for demultiplexing a multiplexed signal of the service signal and the detecting signal received by the receiving fiber of the NE to isolate the service signal.

3. The NE according to claim 1, further comprising a reflecting module configured for reflecting, at an optical fiber connector of the NE using a fixed wavelength reflecting sheet, the detecting signal transmitted by an NE at an opposite end.

4. The NE according to claim 1, wherein the transmission delay determining unit comprises:
   a detecting delay determining subunit configured for determining the detecting signal transmission delay $P1=(t2-t1)/2$ for transmission of the detecting signal in the optical fiber, with the t2 being an echo time when the OTDR asymmetry detecting module receives the echo of the detecting signal returned by the optical fiber, and the t1 being a transmitting time when the OTDR asymmetry detecting module transmits the detecting signal in the optical fiber; and
   a service delay determining subunit configured for determining the service signal transmission delay $P2=(n2/n1) \times P1$ for transmission of the service signal in the optical fiber, with n2 being an index of refraction of the optical fiber for a frequency of the service signal, and n1 being an index of refraction of the optical fiber for a frequency of the detecting signal.

5. The NE according to claim 4, wherein the optical fiber comprises a first optical fiber and a second optical fiber,
   the transmitting unit is configured for transmitting the detecting signal respectively in the first optical fiber and the second optical fiber;
   the receiving unit is configured for receiving an echo of the detecting signal returned by the first optical fiber and receiving an echo of the detecting signal returned) by the second optical fiber; and
   the transmission delay determining unit is configured for: determining, according to a first lag between transmitting the detecting signal in the first optical fiber and receiving the echo of the detecting signal returned by the first optical fiber, a first detecting signal transmission delay for transmission of the detecting signal in the first optical fiber; determining, according to a second lag between transmitting the detecting signal in the second optical fiber and receiving the echo of the detecting signal returned by the second optical fiber, a second detecting signal transmission delay for transmission of the detecting signal in the second optical fiber; determining the first service signal transmission delay according to the first detecting signal transmission delay; and) determining the second service signal transmission delay according to the second detecting signal transmission delay.

6. The NE according to claim 5, wherein
   the NE is configured for: sending the first service signal transmission delay and the second service signal transmission delay to an NE at an opposite end.

7. The NE according to claim 5, further comprising a delay compensating module and a clock synchronization correcting module, wherein
the delay compensating module is configured for computing an asymmetric delay between the first optical fiber and the second optical fiber according to the first service signal transmission delay and the second service signal transmission delay; and
the clock synchronization correcting module is configured for performing clock synchronization correction according to the asymmetric delay.

8. The NE according to claim 7, wherein the delay compensating module is configured for computing the asymmetric delay M=P21−P22 between the first optical fiber and the second optical fiber, with P21 being the first service signal transmission delay, and P22 being the second service signal transmission delay.

9. The NE according to claim 4, further comprising a delay compensating module and a clock synchronization correcting module, wherein the optical fiber is a first optical fiber; the lag is a first lag between transmitting the detecting signal in the first optical fiber and receiving the echo of the detecting signal returned by the first optical fiber; the detecting signal transmission delay is a first detecting signal transmission delay; and the service signal transmission delay is a first service signal transmission delay for transmission of the service signal in the first optical fiber;
the delay compensating module is configured for: receiving a second service signal transmission delay for transmission of the service signal in a second optical fiber, the second service signal transmission delay being sent by an NE at an opposite end; and computing an asymmetric delay between the first optical fiber and the second optical fiber according to the first service signal transmission delay and the second service signal transmission delay; and
the clock synchronization correcting module is configured for performing clock synchronization correction according to the asymmetric delay.

10. The NE according to claim 9, wherein the delay compensating module is configured for computing the asymmetric delay M=P21−P22 between the first optical fiber and the second optical fiber, with P21 being the first service signal transmission delay, and P22 being the second service signal transmission delay.

11. The NE according to claim 10, wherein the delay compensating module is configured for computing the asymmetric delay M at a preset cycle, averaging over any asymmetric delay M computed within a preset processing duration, and sending the average asymmetric delay to the clock synchronization correcting module.

12. The NE according to claim 10, wherein the clock synchronization correcting module comprises:
a timestamp counter configured for recording clock synchronization message timestamps T1, T2, T3, and T4;
a compensation computing unit configured for computing an asymmetric delay compensation Offset=[(A−B)+M]/2, with A=T2−T1, and B=T4−T3; and
a clock synchronization correcting unit configured for performing clock synchronization correction according to the asymmetric delay compensation.

13. The NE according to claim 4, wherein
the NE is configured for sending the service signal transmission delay to an NE at an opposite end.

14. The NE according to claim 1, wherein the detecting signal is a detecting optical pulse, the service signal is a service optical pulse, and a frequency of the detecting optical pulse differs from a frequency of the service optical pulse.

15. A clock synchronization method with automatic optical fiber asymmetry detection, comprising:
transmitting, by a slave end, a detecting signal respectively in a first optical fiber and a second optical fiber;
receiving, by the slave end, an echo of the detecting signal returned by the first optical fiber and receiving an echo of the detecting signal returned by the second optical fiber;
determining, by the slave end according to a first lag between transmitting the detecting signal in the first optical fiber and receiving the echo of the detecting signal returned by the first optical fiber, a first detecting signal transmission delay for transmission of the detecting signal in the first optical fiber; determining a first service signal transmission delay for transmission of a service signal in the first optical fiber according to the first detecting signal transmission delay; determining, according to a second lag between transmitting the detecting signal in the second optical fiber and receiving the echo of the detecting signal returned by the second optical fiber, a second detecting signal transmission delay for transmission of the detecting signal in the second optical fiber; and determining, according to the second detecting signal transmission delay, a second service signal transmission delay for transmission of the service signal in the second optical fiber;
computing, by the slave end, an asymmetric delay between the first optical fiber and the second optical fiber according to the first service signal transmission delay and the second service signal transmission delay; and
performing, by the slave end, clock synchronization correction according to the asymmetric delay.

16. The method according to claim 15, wherein when the first optical fiber is a transmitting fiber of the slave end and the second optical fiber is a receiving fiber of the slave end,
multiplexing, by the slave end, the service signal and the detecting signal, sending the multiplexed signal of the service signal and the detecting signal in the first optical fiber, and isolating the reflected and/or scattered detecting signal by demultiplexing a signal reflected and/or scattered by the first optical fiber; and sending, by the slave end, the detecting signal in the second optical fiber, and isolating a reflected and/or scattered detecting signal and a service signal sent by a master end by demultiplexing a signal received from the second optical fiber;
when the first optical fiber is a receiving fiber of the slave end and the second optical fiber is a transmitting fiber of the slave end, multiplexing, by the slave end, the service signal and the detecting signal, sending the multiplexed signal of the service signal and the detecting signal in the second optical fiber, and isolating the reflected and/or scattered detecting signal by demultiplexing a signal reflected and/or scattered by the second optical fiber; and sending, by the slave end, the detecting signal in the first optical fiber, and isolating a reflected and/or scattered detecting signal and a service signal sent by a master end by demultiplexing a signal received from the first optical fiber,
wherein when the first optical fiber is a transmitting fiber of the slave end and the second optical fiber is a receiving fiber of the slave end, when a multiplexed signal of the service signal and the detecting signal sent by the slave end is received from the first optical fiber, the detecting signal is reflected by the master end at an optical fiber connector connecting the first optical fiber using a fixed wavelength reflecting sheet; and when a detecting signal sent by the slave end is received from the second optical fiber, the detecting signal is reflected by the master end at an optical fiber connector connecting the second optical fiber using a fixed wavelength reflecting sheet;

when the first optical fiber is a receiving fiber of the slave end and the second optical fiber is a transmitting fiber of the slave end, when a multiplexed signal of the service signal and the detecting signal sent by the slave end is received from the second optical fiber, the detecting signal is reflected by the master end at an optical fiber connector connecting the second optical fiber using a fixed wavelength reflecting sheet; and when a detecting signal sent by the slave end is received from the first optical fiber, the detecting signal is reflected by the master end at an optical fiber connector connecting the first optical fiber using a fixed wavelength reflecting sheet.

17. The method according to claim 15, wherein determining the first detecting signal transmission delay according to the first lag between transmitting the detecting signal in the first optical fiber and receiving the echo of the detecting signal returned by the first optical fiber, and determining the first service signal transmission delay according to the first detecting signal transmission delay comprises:

determining the first detecting signal transmission delay $P11=(t21-t11)/2$, with $t21$ being a first echo time when receiving the echo of the detecting signal returned by the first optical fiber, and $t11$ being a first transmitting time when transmitting the detecting signal in the first optical fiber; and determining the first service signal transmission delay $P21=(n21/n11)\times P11$, with $n21$ being an index of refraction of the first optical fiber for the service signal, and $n11$ being an index of refraction of the first optical fiber for the detecting signal; and determining the second detecting signal transmission delay according to the second lag between transmitting the detecting signal in the second optical fiber and receiving the echo of the detecting signal returned by the second optical fiber, and determining the second service signal transmission delay according to the second detecting signal transmission delay comprises: determining the second detecting signal transmission delay $P12=(t22-t12)/2$, with $t22$ being a second echo time when receiving the echo of the detecting signal returned by the second optical fiber, and $t12$ being a second transmitting time when transmitting the detecting signal in the second optical fiber; and determining the second service signal transmission delay $P22=(n22/n12)\times P12$, with $n22$ being an index of refraction of the second optical fiber for the service signal, and $n12$ being an index of refraction of the second optical fiber for the detecting signal, wherein computing the asymmetric delay between the first optical fiber and the second optical fiber according to the first service signal transmission delay and the second service signal transmission delay comprises:

computing the asymmetric delay $M=P21-P22$ between the first optical fiber and the second optical fiber, wherein the performing, by the slave end, clock synchronization correction according to the asymmetric delay comprises:

recording, by a timestamp counter, clock synchronization message timestamps T1, T2, T3, and T4;

computing an asymmetric delay compensation Offset= $[(A-B)+M]/2$, with $A=T2-T1$, and $B=T4-T3$; and performing clock synchronization correction according to the asymmetric delay compensation.

18. A clock synchronization method with automatic optical fiber asymmetry detection, comprising:

transmitting, by a master end, a detecting signal respectively in a first optical fiber and a second optical fiber;

receiving, by the master end, an echo of the detecting signal returned by the first optical fiber and receiving an echo of the detecting signal returned by the second optical fiber;

determining, by the master end according to a first lag between transmitting the detecting signal in the first optical fiber and receiving the echo of the detecting signal returned by the first optical fiber, a first detecting signal transmission delay for transmission of the detecting signal in the first optical fiber; determining a first service signal transmission delay for transmission of a service signal in the first optical fiber according to the first detecting signal transmission delay; determining, according to a second lag between transmitting the detecting signal in the second optical fiber and receiving the echo of the detecting signal returned by the second optical fiber, a second detecting signal transmission delay for transmission of the detecting signal in the second optical fiber; and determining, according to the second detecting signal transmission delay, a second service signal transmission delay for transmission of the service signal in the second optical fiber; and sending, by the master end, the first service signal transmission delay and the second service signal transmission delay to a slave end, such that the slave end computes an asymmetric delay between the first optical fiber and the second optical fiber according to the first service signal transmission delay and the second service signal transmission delay, and performs clock synchronization correction according to the asymmetric delay.

19. A clock synchronization method with automatic optical fiber asymmetry detection, comprising:

transmitting, by a slave end, a detecting signal in a first optical fiber, and receiving an echo of the detecting signal returned by the first optical fiber;

determining, by the slave end according to a first lag between transmitting the detecting signal in the first optical fiber and receiving the echo of the detecting signal returned by the first optical fiber, a first detecting signal transmission delay for transmission of the detecting signal in the first optical fiber; and determining, according to the first detecting signal transmission delay, a first service signal transmission delay for transmission of a service signal in the first optical fiber;

computing, by the slave end according to the first service signal transmission delay and a received second service signal transmission delay sent by a master end for transmission of the service signal in a second optical fiber, an asymmetric delay between the first optical fiber and the second optical fiber, wherein the master end acquires the second service signal transmission delay by: transmitting a detecting signal in the second optical fiber, receiving an echo of the detecting signal returned by the second optical fiber, determining, according to a second lag between transmitting the detecting signal in the second optical fiber and receiving the echo of the detecting signal returned by the second optical fiber, a second detecting signal transmission delay for transmission of the detecting signal in the second optical fiber, and determining, according to the second detecting signal transmission delay, the second service signal transmission delay; and performing, by the slave end, clock synchronization correction according to the asymmetric delay.

20. The method according to claim 19, wherein the first optical fiber is a transmitting fiber of the slave end and a receiving fiber of the master end and the second optical fiber is a receiving fiber of the slave end and a transmitting fiber of the master end; or the first optical fiber is a transmitting fiber of the master end and a receiving fiber of the slave end and the second optical fiber is a receiving fiber of the master end and a transmitting fiber of the slave end.

21. The method according to claim 19, wherein determining the first detecting signal transmission delay according to the first lag between transmitting the detecting signal in the first optical fiber and receiving the echo of the detecting signal returned by the first optical fiber, and determining the first service signal transmission delay according to the first detecting signal transmission delay comprises:

determining the first detecting signal transmission delay $P11=(t21-t11)/2$, with $t21$ being a first echo time when receiving the echo of the detecting signal returned by the first optical fiber, and $t11$ being a first transmitting time when transmitting the detecting signal in the first optical fiber; and determining the first service signal transmission delay $P21=(n21/n11) \times P11$, with $n21$ being an index of refraction of the first optical fiber for the service signal, and $n11$ being an index of refraction of the first optical fiber for the detecting signal; and the determining, according to a second lag between transmitting the detecting signal in the second optical fiber and receiving the echo of the detecting signal returned by the second optical fiber, a second detecting signal transmission delay for transmission of the detecting signal in the second optical fiber, and determining, according to the second detecting signal transmission delay, the second service signal transmission delay comprises: determining the second detecting signal transmission delay $P12=(t22-t12)/2$, with $t22$ being a second echo time when receiving the echo of the detecting signal returned by the second optical fiber, and $t12$ being a second transmitting time when transmitting the detecting signal in the second optical fiber; and determining the second service signal transmission delay $P22=(n22/n12) \times P12$, with $n22$ being an index of refraction of the second optical fiber for the service signal, and $n12$ being an index of refraction of the second optical fiber for the detecting signal, wherein computing the asymmetric delay between the first optical fiber and the second optical fiber according to the first service signal transmission delay and the second service signal transmission delay comprises:

computing the asymmetric delay $M=P21-P22$ between the first optical fiber and the second optical fiber, wherein the performing, by the slave end, clock synchronization correction according to the asymmetric delay comprises:

recording, by a timestamp counter, clock synchronization message timestamps $T1$, $T2$, $T3$, and $T4$;

computing an asymmetric delay compensation $Offset=[(A-B)+M]/2$, with $A=T2-T1$, and $B=T4-T3$; and performing clock synchronization correction according to the asymmetric delay compensation.

22. The method according to claim 19, wherein when the first optical fiber is a transmitting fiber of the slave end and a receiving fiber of the master end and the second optical fiber is a receiving fiber of the slave end and a transmitting fiber of the master end, multiplexing, by the slave end, the service signal and the detecting signal, sending the multiplexed signal of the service signal and the detecting signal in the first optical fiber, and isolating the detecting signal by demultiplexing a signal reflected and/or scattered by the first optical fiber, wherein the master end multiplexes the service signal and the detecting signal, sends the multiplexed signal of the service signal and the detecting signal in the second optical fiber, and demultiplexes a signal reflected and/or scattered by the second optical fiber to isolate the detecting signal, wherein when a multiplexed signal of the service signal and the detecting signal sent by the master end is received from the second optical fiber, the detecting signal is reflected by the slave end at an optical fiber connector connecting the second optical fiber using a fixed wavelength reflecting sheet; and when a multiplexed signal of the service signal and the detecting signal sent by the slave end is received from the first optical fiber, the detecting signal is reflected by the master end at an optical fiber connector connecting the first optical fiber using a fixed wavelength reflecting sheet.

* * * * *